(12) United States Patent
Kim et al.

(10) Patent No.: US 12,068,607 B2
(45) Date of Patent: Aug. 20, 2024

(54) SYSTEM AND METHOD FOR AUTOMATED TUNING/CONFIGURING OF A POWER SYSTEM STABILIZER (PSS) IN A DIGITAL EXCITATION CONTROL SYSTEM

(71) Applicant: BASLER ELECTRIC COMPANY, Highland, IL (US)

(72) Inventors: Kiyong Kim, Collinsville, IL (US); Daniel Weber, Manchester, MO (US)

(73) Assignee: Basler Electric Company, Highland, IL (US)

(*) Notice: Subject to any disclaimer, the term of this patent is extended or adjusted under 35 U.S.C. 154(b) by 0 days.

(21) Appl. No.: 17/922,193

(22) PCT Filed: Feb. 22, 2021

(86) PCT No.: PCT/US2021/019057
§ 371 (c)(1),
(2) Date: Oct. 28, 2022

(87) PCT Pub. No.: WO2021/242337
PCT Pub. Date: Dec. 2, 2021

(65) Prior Publication Data
US 2023/0178990 A1 Jun. 8, 2023

Related U.S. Application Data

(60) Provisional application No. 63/031,308, filed on May 28, 2020.

(51) Int. Cl.
*H02J 3/24* (2006.01)
*G05B 19/042* (2006.01)
(Continued)

(52) U.S. Cl.
CPC .............. *H02J 3/24* (2013.01); *G05B 19/042* (2013.01); *H02J 3/381* (2013.01); *H02P 9/02* (2013.01); *G05B 2219/2639* (2013.01)

(58) Field of Classification Search
CPC ................ H02J 3/24; H02J 3/381; H02P 9/02
See application file for complete search history.

(56) References Cited

U.S. PATENT DOCUMENTS

2007/0208677 A1 9/2007 Golderg et al.
2009/0195224 A1 8/2009 Kim
(Continued)

FOREIGN PATENT DOCUMENTS

| CN | 104113071 B | 1/2016 |
|---|---|---|
| CN | 205229416 U | 5/2016 |
| WO | 2009097605 A1 | 8/2009 |

OTHER PUBLICATIONS

International Search Report mailed May 7, 2021 in PCT/US2021/019057.
(Continued)

*Primary Examiner* — Sean Gugger
(74) *Attorney, Agent, or Firm* — McPherson D. Moore; Joseph M. Rolnicki; Sandberg Phoenix & von Gontard, PC

(57) ABSTRACT

A system and method for automatically tuning/configuring a power system stabilizer (PSS) in a power system digital excitation control system having an automatic voltage regulator (AVR) that includes providing a control input to the AVR as a function of generating a set of tuning PSS lead-lag phase compensation time constants as a function of received generated terminal voltages, generating an uncompensated frequency response as a function of the received set of generated terminal voltages and using particle swarm optimization (PSO) as a function of the generated uncompensated frequency response, generating a tuning PSS gain value as a function of a determined open loop frequency response of the power system, determining a PSS gain margin, determining a tuning PSS gain; and transmitting the
(Continued)

determined set of tuning phase compensation time constants and the determined tuning PSS gain value to the control interface of the PSS.

62 Claims, 13 Drawing Sheets

(51) Int. Cl.
*H02J 3/38* (2006.01)
*H02P 9/02* (2006.01)

(56) References Cited

U.S. PATENT DOCUMENTS

| | | |
|---|---|---|
| 2009/0198386 A1 | 8/2009 | Kim et al. |
| 2012/0259477 A1 | 10/2012 | Abido et al. |
| 2016/0025023 A1 | 1/2016 | Kim et al. |
| 2018/0152020 A1 | 5/2018 | Kuroda et al. |
| 2018/0349525 A1 | 12/2018 | Shokooh et al. |

OTHER PUBLICATIONS

Written Opinion mailed May 7, 2021 in PCT/US2021/019057.
Anonymous: "WECC Power System Stabilizer Tuning Guidelines", Mar. 8, 2019, XP093145388, Retrieved from the Internet: URL: https://www.wecc.org/Reliability/Power%20System%20Stabilizer%20Tuning%20Guidelines.pdf.
Wangdi Rinchen et al, "Power System Stabilizer Tuning by Incorporating WECC Criterion into Particle Swarm Optimization", 2019 7th International Electrical Engineering Congress (IEECON), IEEE, Mar. 6, 2019, pp. 1-4, XP033677443.
Toshio Inoue et al., "Estimation of Power System Inertia Constant and Capacity of Spinning-reserve Support Generators Using Measured Frequency Transients", IEEE Transactions on Power Systems, IEEE, USA, vol. 12, No. 1, Feb. 1, 1997, pp. 136-143.
Extended/Supplementary European Search Report for European Patent Application 21812880.9, issued Apr. 15, 2024.

SYSTEM AND METHOD FOR AUTOMATED TUNING/CONFIGURING OF A POWER SYSTEM STABILIZER (PSS) IN A DIGITAL EXCITATION CONTROL SYSTEM

RELATED APPLICATIONS

This application claims priority to U.S. Provisional Appl. No. 63/031,308 filed May 28, 2020 which is incorporated herein by reference.

STATEMENT REGARDING FEDERALLY SPONSORED RESEARCH

Not Applicable.

BACKGROUND ART

The present disclosure relates to alternating current power generation systems, and, more specifically, to a system and method for an excitation control system for commissioning a generator.

The statements in this section merely provide background information related to the present disclosure and may not constitute prior art.

Grid-connected power generator systems or generating systems are used to provide electricity for distributed power generation systems which often include prime power, standby generation, and network support. Generating systems often consist of a prime mover, a synchronous machine or generator, a speed controller for the prime mover, and an automatic voltage regulator (AVR). The prime mover's speed controller often includes a governor and a fuel pump. The AVR also includes as a control input a power system stabilizer (PSS), which can be a standalone system or can be implemented as a module or functionality of the AVR.

A generating system often consists of a prime mover, a synchronous machine, and two controllers: a speed governor and an automatic voltage regulator. The synchronous machine typically employs a round rotor or a salient-pole rotor. FIG. 1 illustrates a prior art system 20 generating system arrangement. Basic components of system 20 include components also indicated in FIG. 2 by the same numbers. Those components include a generator 28, an exciter 26, an automatic voltage regulator (AVR) 22, a power system stabilizer PSS 23 (which while shown separately can be implemented as a standalone system or can be implemented as a module or functionality of the AVR), an amplifier 24, a governor 30, and its related fuel pump 32. As known, the PSS 23 is used when the generating system 20 is connected to a grid or power system 88 to provide power $Q_c$ including real electro-mechanical power $P_e'$ during commissioning. A governor 30 has been used to maintain constant generator speed ω 52. Governor 30 responds to changes in generator speed ω 52 to act as a feedback controller to control the fuel rate of the fuel pump 32 to thereby minimize deviations by a sudden change in the generating system's real-power load.

As shown in FIG. 1, $V_{ref}$ 34 is a generator voltage reference, $V_t$ 36 is the generator terminal voltage and Err' 37 is exciter 26 field voltage. Further, in block 1/2H 42, 1/2H represents the total moment of inertia of a prime mover (not explicitly shown) and generator rotating parts, $T_m$ 44 represents mechanical torque as to the prime mover and generator rotating parts, $T_f$ 46 represents friction torque of the prime mover and generator rotating parts, $T_{max}$ 48 represents maximum torque as to the prime mover and generator, and $ω_{ref}$ 50 is the generator speed reference, while ω 52 represents the generator speed. The "s" in the 1/s block 54 is the Laplace operator (also sometimes shown throughout the Figures as "S").

When the generating system 20 is connected to the power system 88, such as a grid, the real electro-mechanical power $P_e$ 40 is sensed and provided as feedback into the block 60 and into the input 25 of the PSS 23. The speed ω of the generator 28 is also fed as an input into the input interface 25 of the PSS 23. The AVR 22, with the input into its summing point from the PSS 23, maintains constant generator terminal voltage $E_t$ by controlling the field current $I_{fd}$ to the exciter 26 through feedback control by summing 56 the generator terminal voltage $V_t$ 36 with the generator voltage reference $V_t$ 34, and the PSS output voltage $V_s$ 37. The generator terminal voltage $V_t$ 36 is determined by multiplying the generator output voltage $V_t$ 36 with the generator speed ω 52. The generated real electro-mechanical power $P_e$ 40 is fed to the speed control loop through the 1/ω 52, shown as block 60. The nominal value of the generator speed ω 52 is 1.0 per unit. The 1/ω block 60 clarifies the unit conversion from electric power to torque for the speed control loop. The speed control loop provides feedback control of the generator speed ω 52 by subtracting 62 the generator speed ω 52 from the generator speed reference $ω_{ref}$ 50.

By way of example, but not limited hereto, generating systems can change operation from no load to full load or varying amounts of load in a short period of time. These changes in load can cause changes in generator speed ω 52 or stalling of the prime mover, among other undesirable effects.

In some power generating systems, such as small power systems, a sudden increase in the generating system's power load causes an increased load torque on the prime mover. Since the load torque exceeds the prime mover's torque and the governor cannot respond instantaneously, the generator speed ω 52 decreases. In such smaller power generating systems, after detecting such a deceleration, the governor increases the fuel supplied to the prime mover. Since the generated voltage is proportional to generator speed ω 52, the generator output voltage $E_t$ decreases due to armature reaction and internal voltage drops. The AVR 22 compensates by increasing the machine's field current $I_{fd}$. FIG. 1 shows simplified generating system models with cross coupling when resistive load is applied, through the interaction between voltage and speed control.

Present-day power generating systems are equipped with a fast acting AVR to control excitation of the generator. The benefits of a fast excitation controller can improve the transient stability of the generator connected to the system. However, the high performance of these AVRs has a destabilizing effect on the power system. Power oscillations of small magnitude and low frequency often persisted for long periods of time. In some cases, this presents a limitation on the amount of power able to be transmitted within the system. Various power system stabilizers have been developed to aid in damping of these power oscillations by modulating the excitation supplied to the synchronous machine.

There are numerous types of PSS systems. An integral of accelerating power PSS is most commonly used in the digital-based excitation system which is described in the IEEE Standard 421.5 as IEEE type PSS2A. For this type of PSS, some of manufacturer data related to the PSS parameters are required to be verified during commissioning, specifically the machine reactance and generating system inertia. Lead-lag time constants for phase compensation and system gain are also required to be tuned for an effective PSS operation.

Currently, the integral of accelerating power type PSS systems must be manually tuned. Manually tuning a digital voltage regulator requires expertise and years of experience to determine the best PSS parameters to be tuned to a particular generator. Further, such manual tuning process takes considerable time. This process is briefly described by A. Murdoch, S. Venkatraman, R. A. Lawson, W. R. Pearson, in "*Integral of Accelerating Power Type PSS Part 1—Theory, Design, and Tuning Methodology*," IEEE Transactions on Energy Conversion, Vol. 14, No. 4, December 1999. The cost of a downed machine due to this manual tuning and its required time is very expensive to the generator system operator. The combined cost of testing and fuel used during such manual testing results in a very high cost to a generator system operator. As such, there is a need for an improved system and method that can tune an integral of accelerating power type PSS system in a fast and less costly manner.

SUMMARY OF THE DISCLOSURE

There is disclosed a system and method for improved tuning of an accelerating power type PSS system. As described herein, the presently disclosed system and method provides for an auto-tuning that provides for setting of PSS parameters without requiring the manual processes that include many trial and errors and starting and stopping of the generator, and the fuel and cost associated with such current trial and error processes. The presently disclosed system and method has been implemented in a digital excitation control system and the provided improved performance has been verified with hardware in the loop simulation.

According to one aspect, a system implemented for automatically tuning/configuring an integral of accelerating power type power system stabilizer (PSS) in a digital excitation control system that is controlling a grid-connected power generator system having a prime mover system providing rotational energy to a generator having an exciter, a plurality of sensors for measuring operational characteristics of the power system, an automatic voltage regulator (AVR) having an input summing point and generating control parameters of the exciter and the generator, the PSS having a memory, a processor, computer executable instructions, a communication control interface for receiving PSS parameters, and an output for generating a control output to the AVR input summing point. The system comprising a control module having a processor, a memory, stored computer executable instructions, a control input, and a control output. The computer executable instructions including instructions configuring the control module for performing the processes of generating a set of tuning PSS lead-lag phase compensation time constants that includes receiving a set of generated terminal voltages during an operation of the power system, generating an uncompensated frequency response of the grid-connected power generator system as a function of the received set of generated terminal voltages, and determining the set of tuning phase compensation time constants includes performing particle swarm optimization (PSO) as a function of the generated uncompensated frequency response. The system also configured for generating a tuning PSS gain value that includes determining an open loop frequency response of the grid-connected power generator system to determine a PSS gain margin, and determining a tuning PSS gain as a function of the determined PSS gain margin. The system further configured for transmitting the determined set of tuning phase compensation time constants and the determined tuning PSS gain value from the control output to the communication control interface of the PSS.

According to yet another aspect, a method and computer executable instructions for performing such a method, for automatically tuning/configuring an integral of accelerating power type power system stabilizer (PSS) in a digital excitation control system that is controlling a grid-connected power generator system having a prime mover system providing rotational energy to a generator having an exciter, a plurality of sensors for measuring operational characteristics of the power system, an automatic voltage regulator (AVR) having an input summing point and generating control parameters of the exciter and the generator, the PSS having a memory, a processor, computer executable instructions, a communication control interface for receiving PSS parameters, and an output for generating a control output to the AVR input summing point. In a control module having a processor, a memory, stored computer executable instructions, a control input, and a control output, the method including generating a set of tuning PSS lead-lag phase compensation time constants including receiving a set of generated terminal voltages during an operation of the power system, generating an uncompensated frequency response of the grid-connected power generator system as a function of the received set of generated terminal voltages and determining the set of tuning phase compensation time constants includes performing particle swarm optimization (PSO) as a function of the generated uncompensated frequency response. The method also including generating a tuning PSS gain value including determining an open loop frequency response of the grid-connected power generator system to determine a PSS gain margin and determining a tuning PSS gain as a function of the determined PSS gain margin. The method further including transmitting the determined set of tuning phase compensation time constants and the determined tuning PSS gain value from the control output to the communication control interface of the PSS.

Further aspects of the present disclosure will be in part apparent and in part pointed out below. It should be understood that various aspects of the disclosure can be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

FIG. 12, including

FIG. 14, including

FIG. 17, including

It should be understood that throughout the drawings, corresponding reference numerals indicate like or corresponding parts and features.

DETAILED DESCRIPTION

The following description is merely exemplary in nature and is not intended to limit the present disclosure or the disclosure's applications or uses. The present disclosure provides a method and system that can be considered to be an "auto-tuning" of an integral of accelerating power PSS. Small random variation of voltage reference step is desirable for minimal disturbance to the generating system. As will be described, after the manufacturer data is verified, the system and process for producing the initial PSS parameters, including the tuning of the phase compensation lead-lag time constants and the PSS gain, has been shown to takes less than five minutes and resulting in a 10 dB gain margin. With the presently described method and system of generating initial integral of accelerating power PSS parameters, commissioning of a generator can be accomplished very quickly with excellent performance results.

1. Generating, Control System, and Test System 1.1 Generating System

Figure 2:
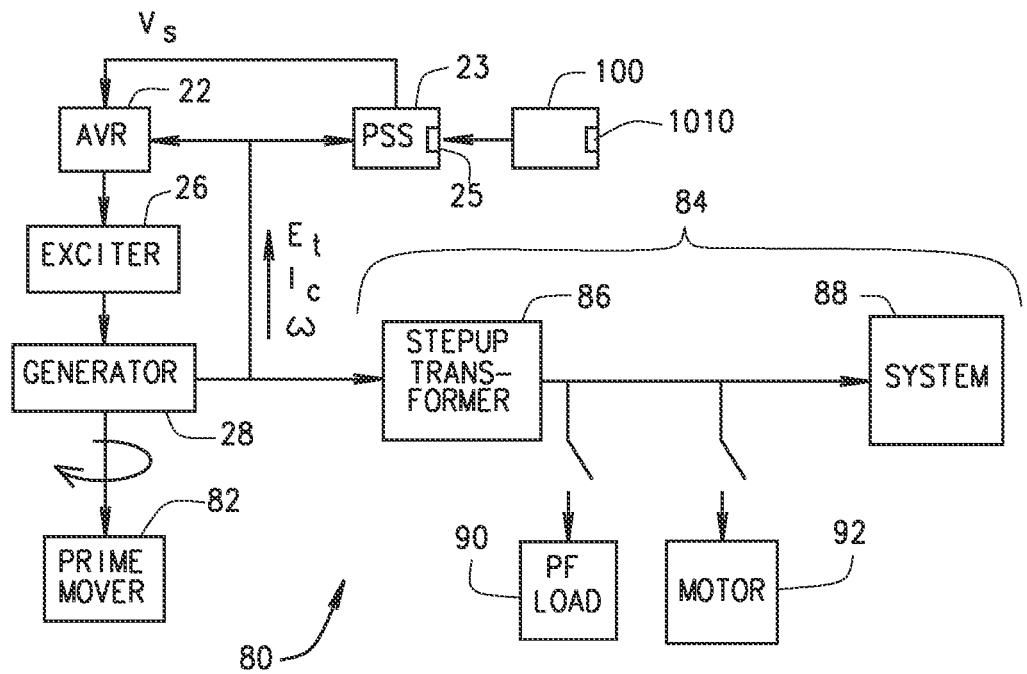
FIG. 2 is a block diagram of a system for a PSS input of an excitation control system utilizing an integral of accelerating power PSS with an improved automatically tuned PSS parameter input controller according to one exemplary embodiment.

As shown in FIG. 2, one exemplary embodiment of a generator control system and method that can be commissioned and operated utilizing an automatic PSS parameter input controller for use with an integral of accelerating power PSS according to one embodiment.

The present system and method are applicable to AC power generators connected to an AC power grid. A typical model for such an AC power generator and associated power system components is illustrated in FIG. 2. As shown, the generator 28 receives a rotational force input from a prime mover 82 that can be, for example, steam turbine driven, gas turbine driven, hydro driven, or diesel driven. The generator 28 receives a field voltage $E_{fd}$ from an exciter 26 that powers field coils in the generator 28 at a variable level. The amount of field voltage $E_{fd}$ provided by the exciter 26 to the generator 28 is determined by the AVR 22. The AVR 22 determines the appropriate amount of field voltage $E_{fd}$ to deliver to the generator 28 based on the operational needs of the power system. The power system stabilizer PSS 23 interworks with the AVR 22 to stabilize the power generated by the generator 28. The AVR 22 and/or PSS 23 monitor a power grid and the terminal voltages $V_t$ and terminal currents $I_t$ at the outputs of the generator 28 to ensure that the generator 28 is operating as desired. Further, the speed ω of the generator 28 is also monitored and provided as an input to the PSS 23. The power grid 84 is modeled by representing transformers 86, transmission lines 88, as well as representing a power factor load 90 and motor loads 92.

At commissioning, the PSS 23 is required to receive at its PSS input interface 25 a set of initial parameters. These initial parameters often include phase compensation for adjusting the two lead and lag time constants to maximize damping and the PSS gain as described by A. Murdoch, S. Venkatraman, R. A. Lawson, W. R. Pearson, in "*Integral of Accelerating Power Type PSS Part 1 — Theory, Design, and*

*Tuning Methodology*," IEEE Transactions on Energy Conversion, Vol. 14, No. 4, December 1999.

As noted in the Background, these are often determined by an engineering operator and input into the PSS 23 on a trial and error basis based on the experience of the engineering operator. The current process requires that the prime mover 82 be started, and then the generator connected and unconnected from the power grid 88 numerous times.

Figure 18:
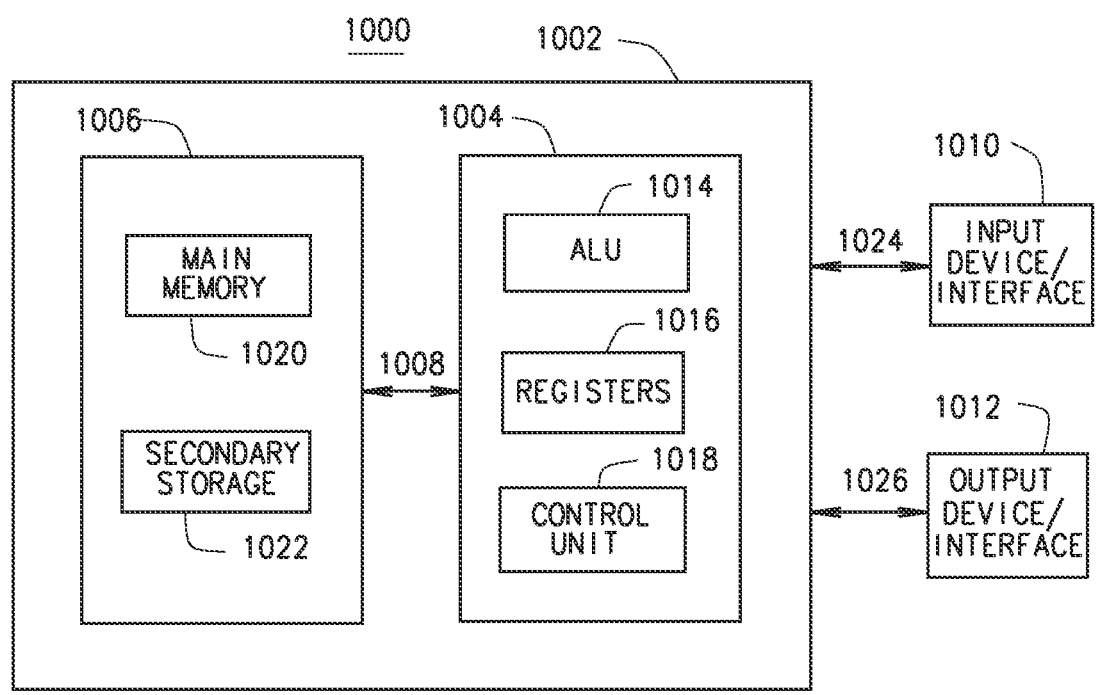
FIG. 18 is a diagram of a system suitable for implementation of the presently disclosed system and method according to one exemplary embodiment.

The present system includes a commissioning control system 100 that is communicatively coupled to the PSS input interface 25 for providing the PSS 23 with its initial set of PSS parameters based on the currently disclosed tuning process, which can utilize a predetermined set or combination of manufacturer specifications. This is particularly applicable to integral of accelerating power PSS systems. The commissioning control system 100 can include various features and elements as described with regard to FIG. 18, which can include a user input interface 1010 as shown in FIG. 18.

1.2 an Integral of Accelerating Power Type Power System Stabilizer (PSS) System A brief overview of the integral of accelerating power type PSS is first described to provide a background for the presently disclosed system and method.

The integral of accelerating power type PSS is a dual input stabilizer that provides supplementary damping for low frequency, local mode oscillations and power system oscillations. It employs two signals: shaft speed and electrical power. This method eliminates the undesirable components from the speed signal (such as noise, lateral shaft run-out, or torsional oscillations) while avoiding a measurement of mechanical power signal.

Direct terminal voltage frequency, measured from the generator potential transformers, has been used as an input signal in many stabilizers, but it cannot be used directly in the integral-of-accelerating power type PSS. Rotor frequency measurement can only be used, which is coupled directly to shaft position changes. The generator rotor frequency or speed ω is referred to as compensated frequency $\omega_{comp}$.

Figure 3:
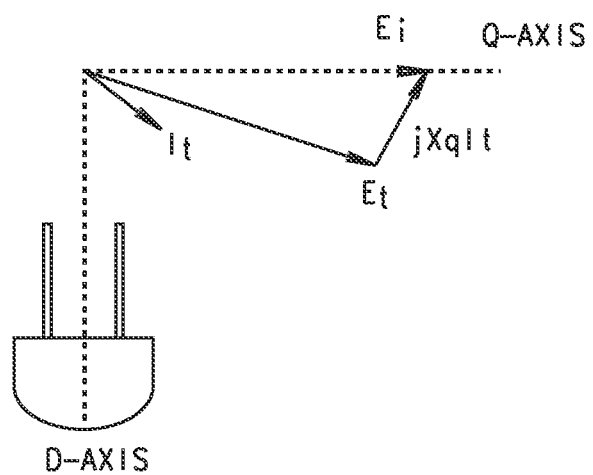
FIG. 3 is a phasor diagram of a generator according to one exemplary embodiment.

The generator rotor shaft is related to the generator terminal voltage $E_t$, and an internal voltage $E_i$ that is proportional to the generator terminal current It as illustrated in the phasor diagram of FIG. 3.

For the steady state, the generator terminal voltage $E_t$ is expressed by equation (1) where $X_q$ denotes an impedance proportional to the quadrature axis impedance, and j denotes the phase shifted, or phase misaligned component of the generator terminal voltage $E_t$, i.e., the "j" represents the imaginary component of the generator terminal voltage $E_t$, as shown in FIG. 3:

$$\bar{E}_i = \bar{E}_t + jX_q \bar{I}_t \quad (1)$$

As the rotor is in motion, the compensating reactance should represent the quadrature reactance that applies to the frequency range of interest.

The equation of motion for rotor, as a function of torque, is described in equation (2):

$$\frac{d}{dt}\omega = \frac{1}{2H}(T_m - T_e) \quad (2)$$

Where
ω=rotor speed
H=generating system inertia
$T_m$=mechanical torque $T_e$=electro-mechanical torque Using the Laplace operator of "s", the motion of the rotor is re-written as equation (3):

$$2Hs\omega = T_m - T_e \quad (3)$$

Since torque is equivalent to power in value at rated speed for a per unit system, mechanical torque $T_m$ and electro-mechanical torque $T_e$ in equation (3) can be replaced with mechanical power $P_m$ and electro-mechanical power $P_e$, respectively. Mechanical power $P_m$ is derived by rearranging equation (3) as shown in equation (4):

$$P_m = 2Hs\omega + P_e \quad (4)$$

As known in the art, mechanical power $P_m$ is difficult to measure. Thus, an amount of mechanical power $P_m$ is synthesized using equation (4) where shaft speed ω and electro-mechanical power $P_e$ are replaced with the compensated frequency $\omega_{comp}$ and electro-mechanical power $P_e$, respectively. In practice, the mechanical power $P_m$ changes slower than electro-mechanical power $P_e$, typically moving in ramps rather than in step functions. A synthesized mechanical power P^m or ($\hat{P}_m$) can be determined by utilizing or passing through a ramp tracking filter. (Note, as used herein, the "^" above a parameter or immediately following a parameter are the same and are used to indicate an estimated value of the parameter.) By way of example, a ramp tracking filter can be used where $T_8 = M \, T_9$, where:
$T_8$=the lead time constant of a ramp tracking filter;
N=the number of ramp tracking filters
M=tracking filter parameter; and
$T_9$=the lag time constant of ramp tracking filter using equation (4B):

$$\left[\frac{sT_8 + 1}{(sT_9 + 1)^M}\right]^N \quad (4B)$$

As such, the accelerating power signal ($P_{acc}$) becomes that of equation (5):

$$P_{acc} = \hat{P}_m - P_e \quad (5)$$

The derived compensated frequency ω^[or $\hat{\omega}$] based on integral of accelerating power is obtained utilizing as a function of the accelerating power signal ($P_{acc}$) as a function of generating system inertia constant H and the Laplace operator "s". The derived compensated frequency ω^ is provided by multiplying the accelerating power signal (Pace) by the total moment of inertia, which includes prime mover rotating parts, generator rotor, etc., which is reflected by the ½Hs as provided by equation (6):

$$\hat{\omega} = (\hat{P}_m - P_e)/2Hs \quad (6)$$

Figure 4A:
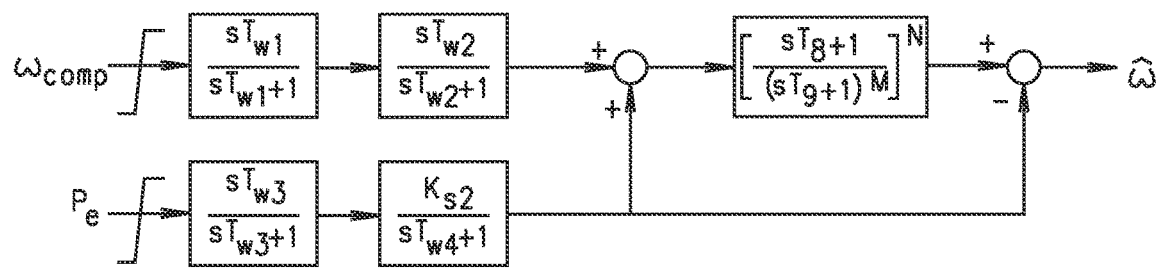
FIG. 4, including FIGS. 4(*a*) and 4(*b*) are functional block diagrams in the Laplace operator form illustrating the generation of the derived compensated frequency and the PSS Gain and phase compensation of an automatically tuned PSS parameter input controller for use with an integral of accelerating power PSS according to one exemplary embodiment.

The FIG. 4(a) illustrates in a block diagram format, the above calculations in process flow format using two washout filters $F_{W1}$ and $F_{W2}$ are used to eliminate the low frequency signals. The numerator of the second washout filter $F_{W2}$ for the input electro-mechanical power $P_e$ is combined with the multiple of two times the generating system inertia H, the Laplace operator "s" or the "2Hs" term, and the fourth washout time constant $T_{w4}$.

$$K_{s2} = T_{w4}/2H. \quad (7)$$

As shown in in FIG. 4(a), the two inputs are the compensated frequency $\omega_{comp}$ and electro-mechanical power $P_e$ in normal operation. Some steady-state values of these inputs $\omega_{comp}$ and $P_e$ can change slowly over long time periods. A washout filter $F_{Wn}$ having washout time constants $T_{Wn}$ is applied to both inputs to eliminate the low frequency signals.

Figure 4B:
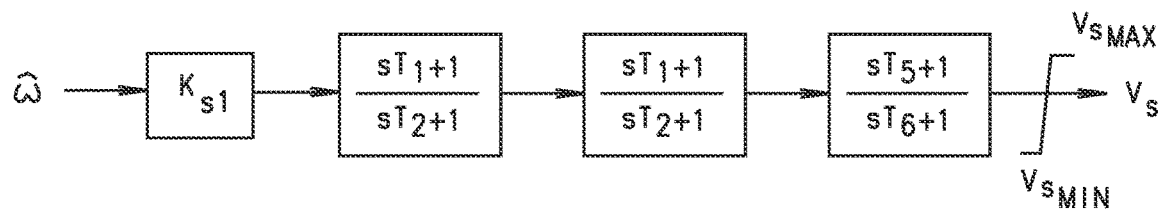

The derived generator compensated frequency $\omega_{comp}$ based on the integral of accelerating power is the input to the second part of the PSS as shown in FIG. 4(b) that applies phase $\varphi$ compensation with 3-stages of lead-lag compensators $C_A$, $C_B$, and $C_C$, a system gain $K_{s1}$, and output maximum/minimum limit $V_{emax}/V_{emin}$ to generate the PSS output signal voltage $V_s$ which is provided as an input to the AVR.

1.3 Test Environment

As will be addressed with the steps of the presently disclosed method and implementing system, the presently disclosed system and method were tested in an implementation with a commercial regulator. An application program with graphic user interface (GUI) was developed for setting and testing of the AVR and PSS parameters. In this test, all computationally intensive calculations, (FFT and PSO routines) were implemented in the developed application program.

Figure 5:
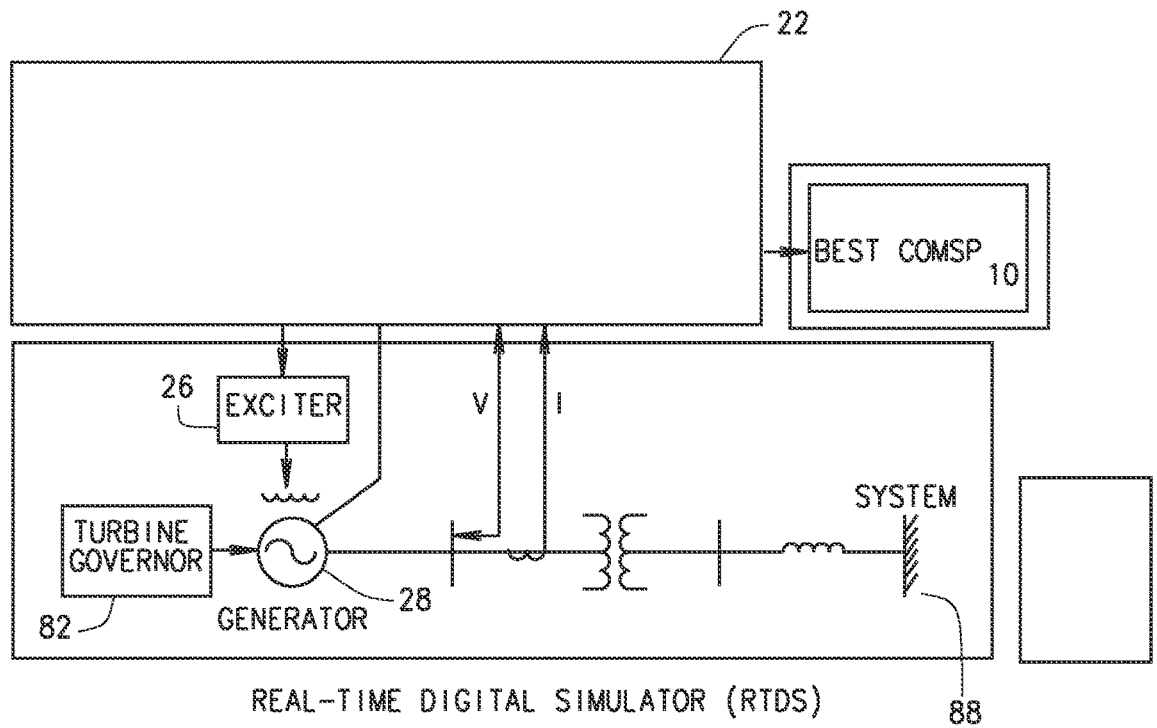
FIG. 5 is a circuit diagram of a Real-time Digital Simulator (RTDS) utilized for testing one exemplary embodiment of the currently disclosed automatic PSS parameter input controller for use with an integral of accelerating power PSS.

These tests were conducted based on the hardware in-the-loop-system as shown in FIG. 5. An actual power system was programmed into a real-time digital simulator RTDS that included the generator, step-up transformer, and system grid. The generator was rated 18 kV and 210MVA, 0.85 pf, 60 Hz round rotor machine. The inertia H was 5.9 MWs/MVA. The generator electric data is provided as follows:

Generator Electric parameter data (210 MVA, 18.0 KV) was as shown in Table A:

TABLE A

Test Manufacturer Generator Parameters

| | | |
|---|---|---|
| $T_{do}' = 9.47$, | $T_{do}'' = 0.06$, | $T_{qo}' = 1.0$, |
| $T_{qo}'' = 0.05$, | $X_d = 1.81$, | $X_q = 1.65$, |
| $X_d' = 0.187$ | $X_q' = 0.6$, | $X_d'' = 0.166$, |
| $X_d'' = 0.166$, | $X_l = 0.15$, | $s(1.0) = 0.1976$, |
| $s(1.2) = 0.4589$ | | |

The excitation system of the machine was assumed to be a static exciter as described in the IEEE 421.5 ST4C model with parameters in Table B:

TABLE B

IEEE 421.5 ST4C Excitation System Parameters

| | | |
|---|---|---|
| $K_{PR} = 14.92$, | $K_{IR} = 2.98$, | $V_{RMAX} = 1.0$, |
| $V_{RMIN} = -0.8$, | $K_{PM} = 1.0$, | $K_{IM} = 0.0$, |
| $V_{Mmax} = 99$, | $V_{Imin} = -99$, | $T_A = 0.01$, |
| $V_{Amax} = 99$, | $V_{Amin} = -99$, | $K_G = 0.0$, |
| $T_G = 0.0$, | $V_{Gmax} = 0.0$, | $K_P = 10.0$, |
| $K_I = 0.0$ | $K_C = 0.15$, | $X_L = 0.0$, |
| $\theta_P = 0.0$ | | |

2. PSS Parameter Tuning Method

As described herein, the present system and a method provides for tuning of an integral of accelerating power PSS through providing initial PSS Parameters to the PSS that reduce the time required for commissioning of the integral of accelerating power PSS in a power generator control system. The presently described system and method involves the process of generating a set of determined integral of accelerating power PSS parameters for the generator and generator system to obtain a proper damping without the need for manual tuning as is currently performed.

The present system and method includes the processes of generating of tuned lead-lag time constants of the phase compensation and the PSS gain as initial integral of accelerating power PSS parameters. Additionally, the system and method can also include the processes of estimating, and where required before generating the tuned lead-lag time constants of the phase compensation and the PSS gain, the process of identifying certain manufacturer data for the generating system parameter values as may not be currently known, or, are not precisely exact for a particular power generating system due to small shifts during transport, installation, modifications during installation, changes in system components, each of which often occur prior to commissioning.

Figure 6:
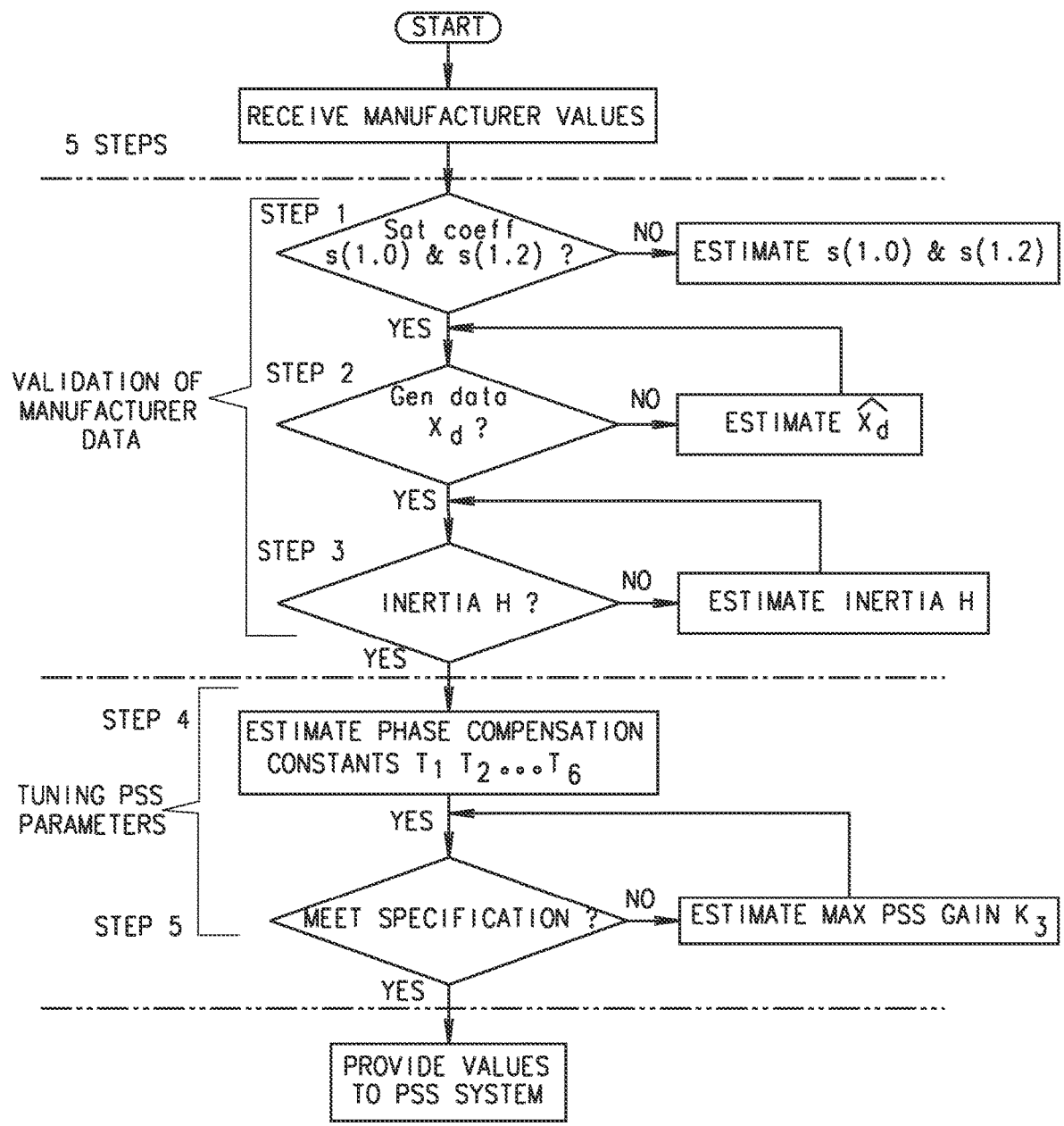
FIG. 6 is a flow diagram of a five step process for an automatically tuned PSS parameter input controller for use with an integral of accelerating power PSS according to one exemplary embodiment.

While the processes of validating and adjusting of all of the manufacture generator system parameters is not always required in every implementation, the following process with include three validating process steps and initial steps to provide a full process flow that can be implemented in some embodiments. This is shown in FIG. 6 as a five step process, but should be understood that one or more of the first three steps are optional and not always required as the first three steps are used to verify manufacturer data of the generating system parameters and adjusting them where it is determined such is required. As shown in FIG. 6, the manufacturer generating system parameters that can be initially verified and adjusted include the generator saturation coefficients, s(1.0) and s(1.2), generator data such as the d-axis synchronous steady state reactance $X_d$. Finally, the generating system inertia constant H can be verified and adjusted as can be required for a particular implementation. From these or from manufacturer provided parameter data values for these, the present system and method provides for generating of tuned lead-lag time constants of the phase compensation and the PSS gain that are then input as the initial parameters for an integral of accelerating power PSS system.

Figure 7:
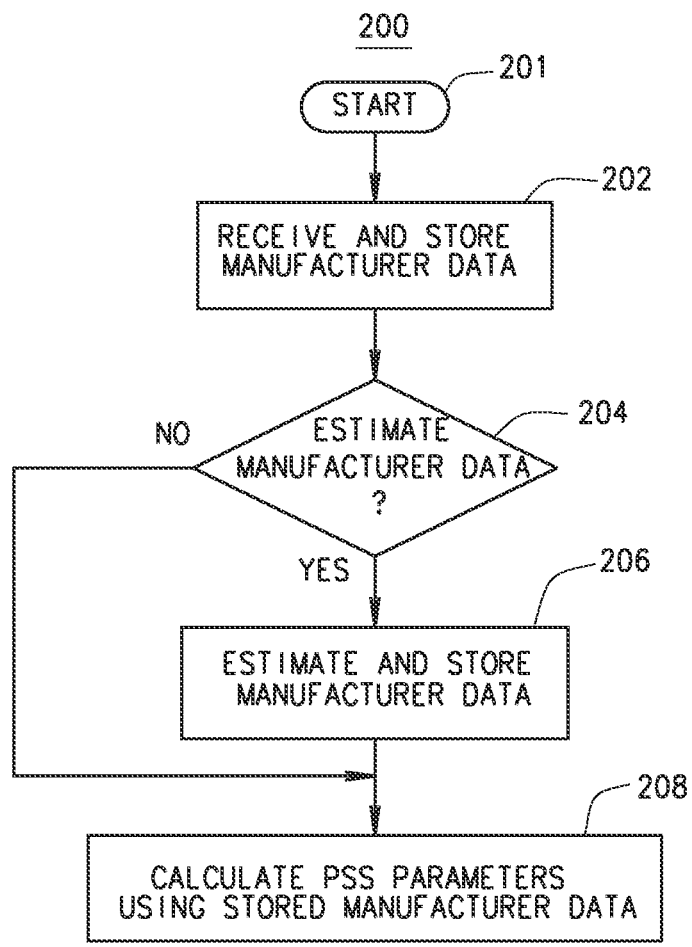
FIG. 7 is a flow diagram of a process for use in Steps 1-3 processes to verify and validate manufacturer parameter values and automatically generate estimated PSS parameters in an automatic PSS parameter generation control system for use with an integral of accelerating power PSS according to one exemplary embodiment.

As an initial high level overview, FIG. 7 provides a flow diagram process 200 as used in Steps 1, 2 and 3 for validation and verifying the manufacturer values for the parameters. As shown the process starts and in process 201 and in process 202 the system and method receives and stores manufacturer data, such as described above. For each of Steps 1, 2 and 3, process 204 provides for the estimation of the manufacturer data, which is required also where no manufacturer data is provided for one or more of the power system parameters. If not estimated, the process advances to process 208 wherein the process calculates PSS parameters using the stored manufacturer's data. If estimated, the process 204 goes to process 206 wherein values for the manufacturer's data are provided according to the processes as described below for each such parameter. Once estimated and stored in process 206, the process then continues to calculate the PSS parameters in process 208.

2.1 Exemplary Full Five-Step Process Flow (FIG. 6).

As noted, a full 5-step process flow will be described as Steps 1 through 5. Steps 1-3 provide for a validation of the manufacturer's parameters, or the derivation and adjustment of such to provide adjusted parameters for use in Steps 4 and 5 generate the PSS input parameters of the tuned lead-lag time constants $T_1$-$T_6$ of the phase $\varphi$ compensation and the PSS gain $K_s$. Each of these 5 steps will be described with reference to FIG. 6 by way of example.

2.1.1 Step 1: Generator Saturation Coefficients s(1.0) and s(1.2)

The parameters of a synchronous machine vary under different loading conditions because of changes of the machine internal temperature, magnetic saturation, aging, and coupling between the machine and external systems. Several assumptions are made to represent saturation in transient stability studies since a rigorous treatment of synchronous machine performance under saturation is a futile exercise. The effect of saturation is characterized by the saturation functions. This variation causes the change in the field voltage $E_{fd}$. In order to handle the saturation effects based on simplicity of estimation method, the field voltage $E_fd$ is determined by a function of the saturation coefficients s(1.0) and s(1.2), and as such, the generator saturation coefficient.

Compensating Frequency $\omega_{comp}$ will need to be determined. In order to determine compensating frequency $\omega_{comp}$ as a first step, for synchronous machines such as generators, the input requirements for characterizing generator saturation for most commercial-grade stability programs are in terms of a saturation coefficient parameter "s." There are often two saturation coefficients used to characterize a generator, a first generator saturation coefficient s(1.0) which is the saturation coefficient where open circuit terminal voltage is 1.0 pu, and a second saturation coefficient s(1.2) where open circuit terminal voltage is 1.2 pu. These amounts are estimated from the measured generator voltages $E_t$ and for field current $I_{fd}$ from 0.8 to 1.05 per unit based on recursive least square method. Saturation coefficient s(1.0) is determined to be equal to parameter $C_1$ and saturation coefficient s(1.2) is determined to be equal to $C_1$ times 1.2 to the power of parameter $C_2$. As such, each saturation coefficient can be determined by determining parameters $C_1$ and $C_2$.

Field current $I_{fd}$ is related to $C_1$ and $C_2$ by formula (8):

$$I_{fd} = E_t[1 + C_1 E_t^{C_2}] \tag{8}$$

Where:

$$C_1 = s(1.0) \tag{9}$$

$$C_2 = \frac{\log\left(\frac{s(1.2)}{s(1.0)}\right)}{\log(1.2)} \tag{10}$$

Equation (8) is rearranged in equation (11):

$$I_{fd}/E_t - 1 = C_1 E_t^{C_2} \tag{11}$$

For the $k^{th}$ sample value it can be expressed as equation (12):

$$I_{fd}(k)/E_t(k) - 1 = C_1 E_t(k)^{C_2} \tag{12}$$

Taking the logarithm of equation (1) gives equation (13):

$$\log\left[\frac{I_{fd}(k)}{E_t(k)} - 1\right] = \log(C_1) + C_2 \log[E_t(k)] \tag{13}$$

Thus, for n sampled values, equation (13) provides:

$$\begin{bmatrix} 1 & \log[E_t(1)] \\ 1 & \log[E_t(2)] \\ \vdots & \vdots \\ 1 & \log[E_t(n)] \end{bmatrix} \begin{bmatrix} \log(C_1) \\ C_2 \end{bmatrix} = \begin{bmatrix} \log\left[\frac{I_{fd}(1)}{E_t(1)} - 1\right] \\ \log\left[\frac{I_{fd}(2)}{E_t(2)} - 1\right] \\ \vdots \\ \log\left[\frac{I_{fd}(n)}{E_t(n)} - 1\right] \end{bmatrix} \tag{14}$$

From this, the estimated values for parameters $C_1$ and $C_2$ can be determined by the least square estimation, where unknown parameters $C_1$ and $C_2$ in equation (14) are chosen in such a way that the sum of the squared errors between the measured or actually observed generator voltage $E_t$ and computed generator voltage $\hat{E}_t$ is minimized.

$$E(\alpha, N) = \sum_{k=1}^{N}(y_k - \phi_k^T \alpha)^2 \tag{15}$$

The parameter $\alpha^T$ is defined by equation (16), parameter $\phi^T_k$ is defined by equation (17), and $y_k$ is defined by equation (18), the parameter $\alpha$ can be developed by closed form solution in equation (19).

$$\alpha^T = [\log(C_1) \quad C_2] \tag{16}$$

$$\phi_k^T = [1 \quad \log[E_t(k)]] \tag{17}$$

$$y_k = \log\left[\frac{I_{fd}(k)}{E_t(k)} - 1\right] \tag{18}$$

$$\hat{\alpha}_k = \left(\sum_{k=1}^{N} \phi_k \phi_k^T\right)^{-1} \left(\sum_{k=1}^{N} \phi_k y_k\right) \tag{19}$$

For efficient real-time estimation, equation (18) is manipulated into a recursive form using a forgetting factor $\lambda$, as described by Kiyong Kim, Pranesh Rao, and Jeffrey A. Burnworth, "Self-Tuning of the PID Controller for a Digital Excitation Control System", IEEE Swarm Intelligence Symposium, St. Louis MO USA, Sep. 21-23, 2008. As one exemplary embodiment, a forgetting factor $\lambda$ can be selected with the value of 0.9. However, it should be understood to those of ordinary skill in the art that other values of a forgetting factor $\lambda$ can be selected and generally should be less than 1.0, with a smaller value providing a lesser influence of old sample data to the estimation results. As such, the recursive form of equation (19) is provided in equations (20), (21), and (22):

$$L_k = P_{k-1} - P_{k-1}\phi_k[\phi_k^T P_{k-1}\phi_k + \lambda]^{-1} \tag{20}$$

$$P_k = \frac{1}{\lambda}(I - L_k \phi_k^T)P_{k-1} \tag{21}$$

$$\hat{\alpha}_k = \hat{\alpha}_{k-1} + L_k[y_k - \phi_k^T \hat{\alpha}_{k-1}] \tag{22}$$

As noted above, after parameters $C_1$ and $C_2$ are determined, saturation coefficient s(1.0) is determined to be equal to parameter $C_1$ and saturation coefficient s(1.2) is determined to be equal to $C_1$ times 1.2 to the power of parameter $C_2$ as shown in equations (23) and (24), respectively.

$$s(1.0) = C_1 \tag{23}$$

$$s(1.2) = C_1 1.2^{C_2} \tag{24}$$

As noted, saturation coefficients s(1.0) and s(1.2) are utilized to determine the compensating Frequency $\omega_{comp}$, or using equations (23) and (24), the parameters $C_1$ and $C_2$ can be used directly for such determination as will be addressed in Step 2.

Figure 8:
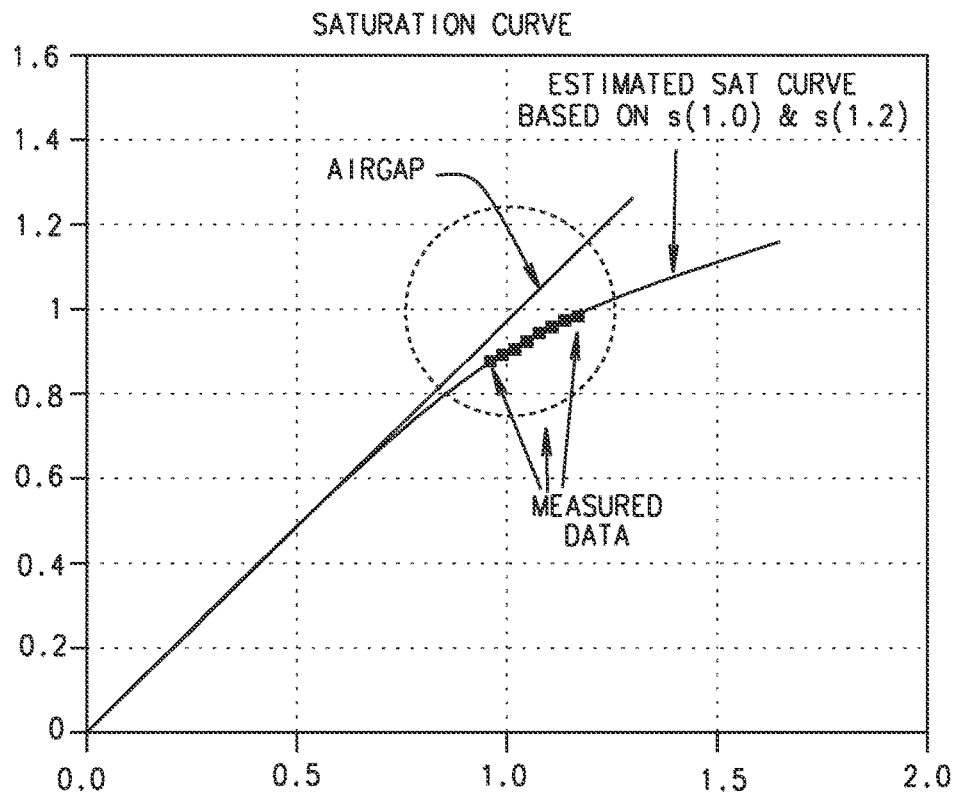
FIG. 8 is a graph illustrating a comparison of the Step 1 generated saturation coefficients and measurements of such during testing as compared to manufacturer values for the saturation according to one test of using the test system of FIG. 3.

In one embodiment of the above described step 1 process, the two saturation coefficient parameters s(1.0) and s(1.2), are measured with the generator offline, i.e., operating but not attached to the grid or load. As the generator voltage increases by 0.01 step from 0.9 to 1.05 pu as shown in FIG. 8, the generator voltage $E_t$ and field current $I_{fd}$ are sampled and saturation coefficients s(1.0) and s(1.2) are calculated using the above described recursive least square method. In one exemplary test, the process of step 1 as described herein provided for the estimated values of the saturation coefficients provided a close match to the manufacturer supplied characteristics as shown in FIG. 8. As known, manufacturer data provides two points on a saturation curve and various non-linear curve fitting schemes can be used to get the saturated values at other points, which by way of example one result is shown in FIG. 8. As shown in FIG. 8, by way of example, two points, s(1.0) and s(1.2), are estimated based on the measured point as shown in FIG. 8 as the measured dotted points. The estimated curve can then be calculated based on these two estimated points s(1.0) and s(1.2) using equations (8), (9), and (10). In this manner, using the estimated saturation coefficient parameters s(1.0) and s(1.2), the present system and method can provide an improved and more accurate set of initial commissioning parameters to the PSS.

2.1.2 Step 2: Validating and Adjusting Compensating Frequency $\omega_{comp}$

The tuning parameter is the compensated q-axis reactance $X_{qcomp}$. The compensated frequency is a function of the q-axis reactance $X_{qcomp}$. As the d-axis synchronous reactances $X_d$ is estimated in equation (24), the compensated q-axis reactance $X_{qcomp}$ can be set at a lower level such as one-third of the estimated d-axis synchronous reactances $\hat{X}_d$.

The generator rotor shaft position is determined by generator's terminal voltage $V_t$ and current $I_t$, and compensating reactance $\hat{X}_d$. The proper compensating reactance $\hat{X}_d$ should be derived from the frequency range of interest. In general, a local model oscillation is about 1 Hz. As known in the art, most of the power oscillations exist between 0.1 and 3.0 Hz, which includes the range where intertie and interarea modes exits (0.1-0.9 Hz), and the local mode power swing modes (1-2 Hz). Thus, an impedance value close to the transient quadrature reactance ($X'_q$) is required. On round-rotor machine, generator synchronous reactance $X_q$ is close to the d-axis synchronous reactances $X_d$. As such, herein d-axis synchronous reactances $X_d$ is used in place of generator synchronous reactance $X_q$.

By way of one example, for salient pole machines, the synchronous impedance provides the required compensation. However, the selection of the correct compensating impedance is more complicated and simulations and site tests are normally performed to confirm this setting. However, for the current method, where no manufacturer data is available, an estimated compensating reactance q-axis synchronous reactance $\hat{X}_{qcomp}$ can be set to the one third of the generator synchronous reactance ($X_q$) by way of one example for initiating the process.

At the steady-state operating condition with no active power exported, $X_d$ is easily estimated where:

$e_q = q$-axis generator voltage; (25)

$i_d = d$-axis generator current;

$E_{fd}$ = generator field current;

$\hat{K}_{sd}$ = generator saturation coefficient at steady state condition;

-continued $R_a$ = generator stator resistance;

$X_l$ = generator leakage reactance;

then equation (24) provides compensating reactance $\hat{X}_d$ as:

$$\hat{X}_d = \frac{E_{fd}\hat{K}_{sd} - e_q}{i_d}$$

The saturation coefficient is calculated using the measured terminal volate $E_t$ and measured terminal current $I_t$ using the air-gap flux linkage as denoted as $\Psi$ in equation (26):

$$\Psi_t = |E_t + (R_a + jX_l)I_t| \quad (26)$$

From this, the generator saturation coefficient at steady state $\hat{K}_{sd}$ is provided in equation (27) using the saturation parameters $C_1$, and $C_2$ as determined in Step 1 above, or from known or measured generator saturation coefficients s(1.0) and s(1.2) using equations (23) and (24).

$$\hat{K}_{sd} = \frac{1}{1 + C_1\Psi_t^{C_2}} \quad (27)$$

Now that the generator saturation coefficient at steady state $\hat{K}_{sd}$ is determined, the compensating reactance $\hat{X}_d$ can be determined using equation (24). For a given operating condition with $E_t$ and $I_t$, the steady state $\hat{K}_{sd}$ is calculated based on equation (25) and (26) and then it is substitute into equation (24) to calculate $\hat{X}_d$. As one with ordinary skill in the art will understand, when no active (real) power is exported, then $e_q = E_t$ and $I_t = i_d$.

In one exemplary embodiment of practicing Step 2, after Step 1 is completed, the generator is connected to the grid and is therefore online. Several voltage step tests are performed with no real electro-mechanical power $P_e$ exported. In one exemplary embodiment, five (5) voltage steps are used, but other number of steps are also possible. The generator synchronous reactances $X_d$ are estimated based on measured generator voltages $E_t$ and reactive powers Q at the steady-state condition. Where no manufacturer data is provided, the compensating reactance q-axis synchronous reactance $\hat{X}_q$ can be estimated from the estimated value of the generator synchronous reactances $X_d$. In one exemplary embodiment, the compensating reactance q-axis synchronous reactance $\hat{X}_q$ can be estimated as one third of the estimated value of the generator synchronous reactances $X_d$.

2.1.3 Step 3: Validating and Adjusting Generating System Inertia H (and Washout Time Constant $T_w$)

As an initial sub-step of Step 3, a pseudo white noise signal is added to the AVR summing point and measurements taken to verify the system parameter values. Local mode frequency and turbine torsional interaction frequency are also identified. The generator real electro-mechanical power $P_e$ is increased to about 0.2 pu when the pseudo white noise signal is added to the AVR summing point. The resultant generator frequency $\omega$, three phase generator terminal voltages $V_t$, and currents $I_t$ are recorded and the changes such as the change $\Delta V_t$ of the terminal voltage can be determined.

All power system oscillation frequencies in the range of 0.1 to 100 Hz are identified by taking the Fast Fourier Transform (FFT) of the measured electro-mechanical power $P_e$ variation or $\Delta P_e$ caused by the pseudo white noise input to the AVR summing point. Resultant frequency spectrum gives various power oscillation modes including turbine generator torsional oscillation frequencies.

Figure 12A:
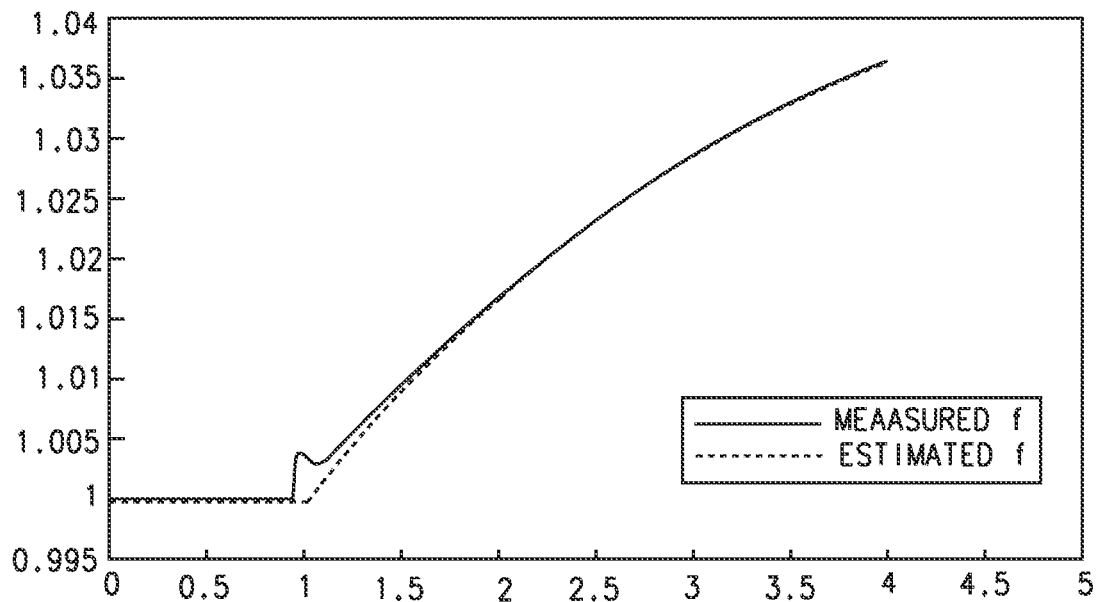
FIGS. 12(a) and 12(b), are graphs generated from tests of an estimated generating system inertia and frequency spectrum of the Step 3 process for the automatic PSS parameter input controller for use with an integral of accelerating power PSS according to one exemplary embodiment.
Figure 12B:
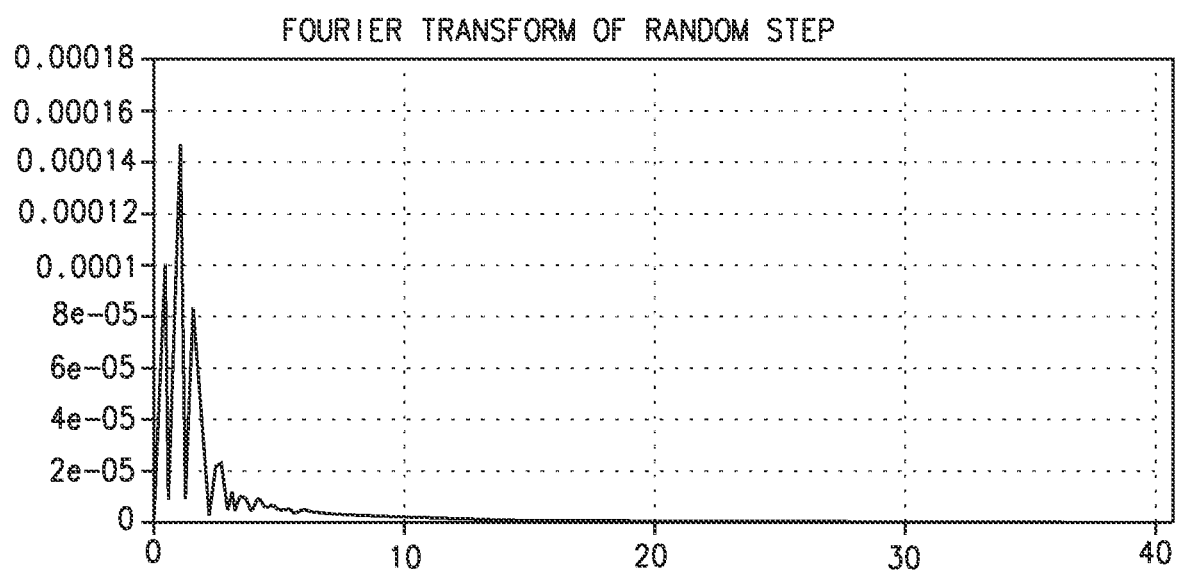

Local mode frequency and turbine torsional interaction frequency are identified using FFT as shown in FIG. 12(b) and as described below based on the largest magnitude. The present process provides for determination of the washout time constant $T_w$ is selected as five times of time constant corresponding to the largest frequency component between about 0.1 to about 3 hertz as will be describe. A proper washout time constant $T_w$ is determined to admit frequencies as low as 0.1 Hz without significant attenuation or the addition of excessive phase lead. It is normally set in the range of 2 to 10, with the value selected based on the proper response of the PSS functions to the power system. If it is 10 seconds, then the filter corner frequency is 0.016 Hz, which is well below intertie mode frequencies. For the currently disclosed tuning scheme, washout time constant $T_w$ is selected as five times of time constant corresponding to the largest frequency component between about 0.1 to about 3 hertz, the frequency range in which most power oscillations exist, i.e., the dominant power oscillation is identified as the largest frequency spectrum. As such, to determine the washout time constant, the largest frequency component in this range is identified. As referred herein, the largest frequency component of the FFT derived resultant frequency spectrum of the measured variation that was caused by the induced white noise, such as the variation/change in the terminal voltage $\Delta V_t$. As known in the art, this process provides an estimate of the power oscillation frequency, local or torsional oscillation mode. Once this is calculated, the time constant for the selected frequency component is determined and then is multiplied by five to determine a "proper" washout time constant. Typically, the washout time constant should be in the range between about 2 and about 10 seconds.

Figure 9:
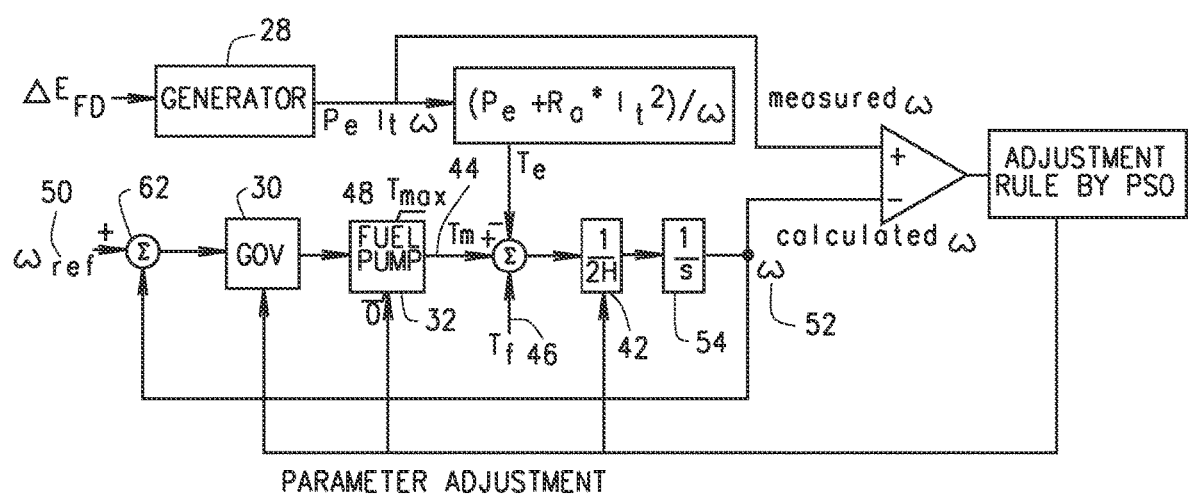
FIG. 9 is a functional block diagram for generating an estimated generating system inertia H according to Step 3 of the presently disclosed method for an automatic PSS parameter input controller for use with an integral of accelerating power PSS according to one exemplary embodiment.

The inertia H of the generating system is estimated using a partial load rejection test. Generator frequency, real power, and current are recorded for this test. particle swarm optimization (PSO) technique is applied to estimate the generating system inertia H. PSO is a known computation technique and has been applied to determine the AVR gains, but has not been used as to PSS parameter estimation. The functional block diagram of the PSO process used to identify the parameters of the equivalent rotor speed or frequency ω control system is illustrated in FIG. 9. The simulation model parameters are generating system inertial H, fuel pump time constant $T_A$, governor proportional gain $K_P$, governor integral gain $K_I$, fuel consumed at no-load $W_{nfl}$, and Droop.

Figure 10:
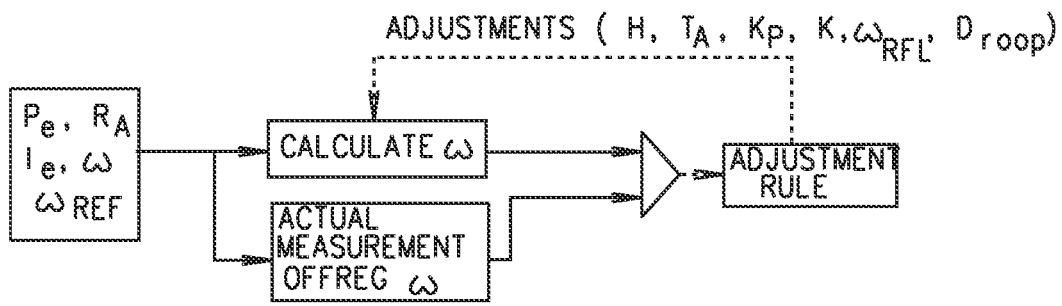
FIG. 10 is a diagram for generating estimated generation inertia H using particle swarm optimization (PSO) method for an automatic PSS parameter generation control system for use with an integral of accelerating power PSS according to one exemplary embodiment.

This PSO process is shown in flow chart for generating the estimated generating system inertia H using PSO is provided in FIG. 10. The generation of the estimated values for the generating system inertia H, using the PSO technique as shown in FIG. 10. As shown, adjustments are made to provide electro-mechanical power $P_e$, Resistance $R_A$, terminal current $I_t$, frequency ω and reference frequency $ω_{ref}$ as an input to calculate frequency ω and to compare that to the actual measurement of the frequency ω. These are compared and then an adjustment rule is generated for one or more of the H (generating system inertia), $T_A$ (fuel pump time constant), $K_P$ (governor proportional gain), $K_I$ (governor integral gain), $W_{nfl}$ (fuel consumed at no-load), and Droop (speed Droop).

The simulation results obtained using the PSO process is compared with the manufacturer values. If the results do not match, the generator parameters are adjusted by the PSO technique to provide the best match. The technique is inspired by the social behavior of bird flocking or fish schooling. In PSO, the potential particles (solutions) fly through the problem space by following the current optimum particles. Each particle keeps track of its coordinates in the problem space and communicates the best solution found to the other particles. This communication allows an intelligent decision on a next attempt to find the best possible solution (a set of generator parameters).

Figure 15:
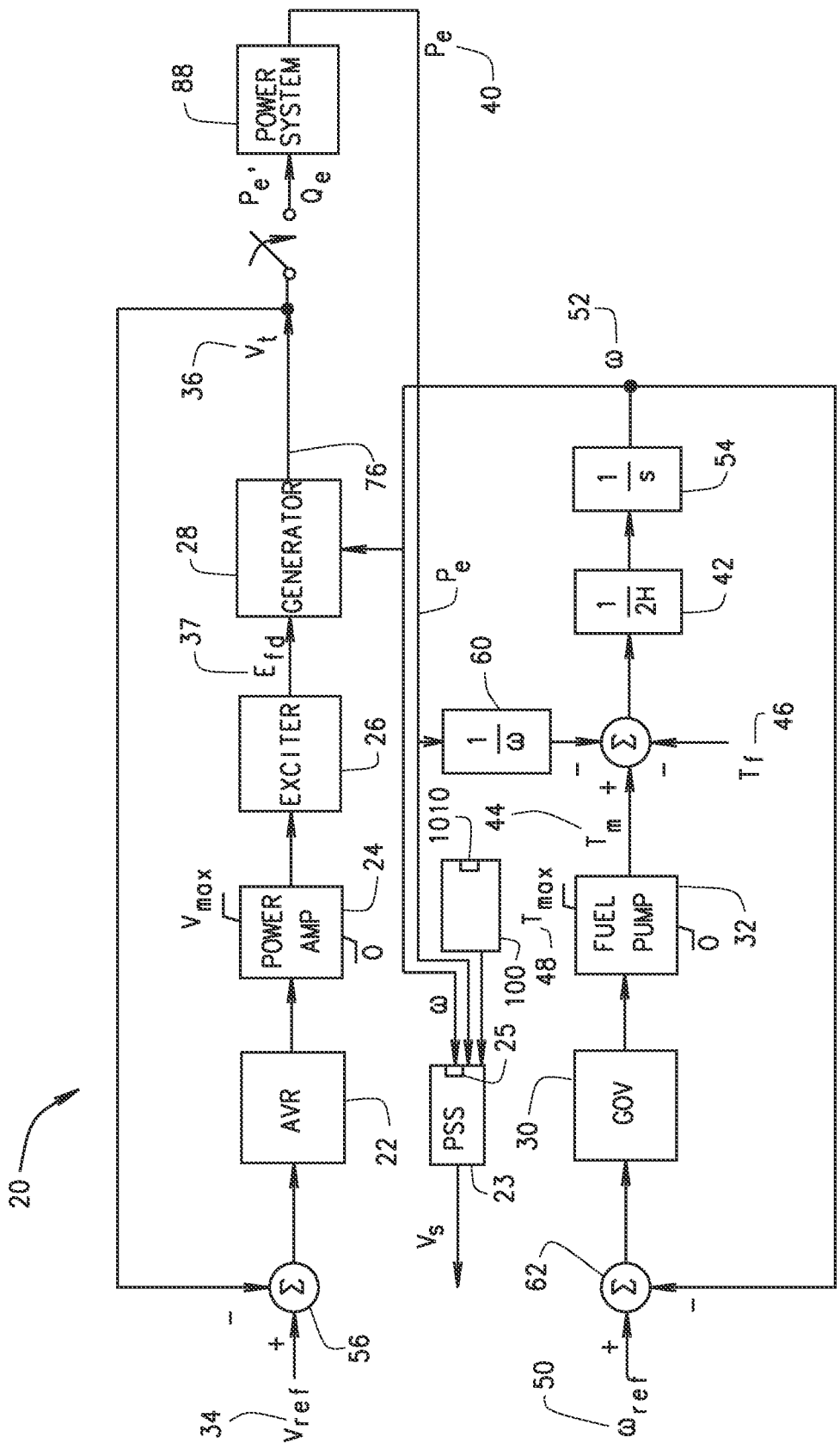
FIG. 15 is a block diagram of an improved generating system with an improved commissioning control system when a power generated system is uses an integral of accelerating power PSS according to one exemplary embodiment.

As will be addressed with regard to FIG. 15, the presently disclosed system and method can be implemented in conjunction with an actual generating system using an automated PSS parameter generation system. In one embodiment, a the present method of generating estimated PSS parameters can be implemented in a MICROSOFT WINDOWS-based application program operating on a computer system capable of operating the WINDOWS environment with the present invention having its own graphic user interface (GUI) and an interface for communicating the generated parameters to the PSS system.

The PSO derived estimated parameter values as disclosed in the Step 3 are based on manufacturer values and also on real time measurements, the PSO method estimates parameter values based on measurements to determine if the manufacturer defined parameter values are appropriate, and to derive through the PSO estimation process new values for such parameters for use in the generation of the PSS parameters of Steps 4 and 5 as will be described below.

The generator frequency variation $\Delta \omega$ is calculated using the time domain simulation with the recorded generator frequency ω, real electro-mechanical power $P_e$, and terminal current $I_t$. Further, as shown generator stator resistance $R_a$ is used in this process. For the simulated system model, proportional and integral type governor and first order fuel pump dynamic equation are assumed for the governor. The simulation model parameters are H (generating system inertia), $T_A$ (fuel pump time constant), $K_P$ (governor proportional gain), $K_I$ (governor integral gain), $W_{nfl}$ (fuel consumed at no-load), and Droop (speed Droop).

The simulation results are compared with the recorded data. If the results do not match, the above model parameters are adjusted by the PSO technique to provide the best match.

The PSO routine starts with a group of ten particles (solutions) and then searches through the problem space for optima by following the optimum particles found so far. With present parameters are considered particles, for each particle (H, $T_A$, $K_P$, $K_I$, $W_{nfl}$, and Droop) the model's step response, $\Delta \omega_m(k)$, is calculated for k=1, . . . , N. The calculated response is compared with the actual system response. Where a sampled value of the actual system response at the k-stage is $\Delta \omega(k)$, the fitness function that chooses the best particle is the sum of the square of the differences between $\Delta \omega(k)$, and $\Delta \omega_m(k)$, k=1, . . . , N as follows:

$$J = \sum_{k=1}^{N} (\Delta \omega(k) - \Delta \omega_m(k))^2 \qquad (28)$$

The initial generator frequency ω, real electro-mechanical power $P_e$ and generated current $I_t$ are provided as inputs. The frequency output is compared for estimating each parameter. simulation model parameters, which are identified as H, $T_A$, $K_P$, $K_1$, $W_{nfl}$, and Droop.

Considering that variable $v_n$ is the particle velocity, variable $x_n$ is the current particle (solution), variable $x_n^{self}$ and variable $x^{global}$ are defined as best values for a particle and best value among all particles, respectively, and that parameter α is an inertia weight, rand₁ and rand₂ are random numbers between 0 and 1, and $\beta_1$ and $\beta_2$ are learning factors, after finding the six best values for each parameter H, $T_A$, $K_P$, $K_I$, $W_{nft}$, and Droop using PSO, the particle updates its velocity and positions with equations (29) and (30):

$$v_{n+1} = \alpha v_n + \beta_1 rand_1(x_n^{self} - x_n) + \beta_2 rand_2(x^{global} - x_n) \quad (29)$$

$$x_{n+1} = x_n + v_{an} \quad (30)$$

Figure 11:
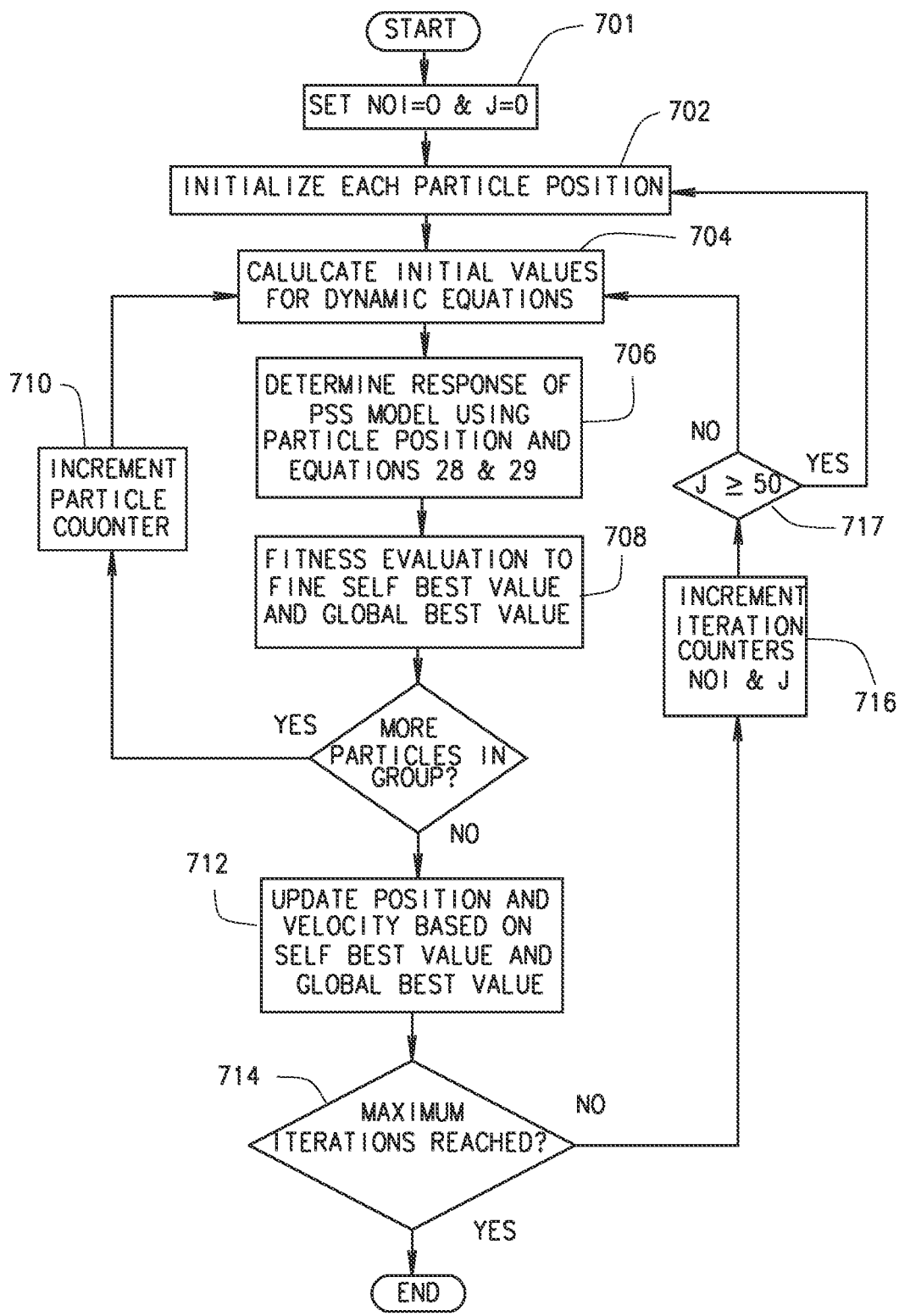
FIG. 11 is a diagram of the particle swarm optimization (PSO) process for Steps 3 and 4 to automatically generate estimated PSS parameters in an automatic PSS parameter generation control system for use with an integral of accelerating power PSS according to one exemplary embodiment.

In one embodiment, referring to FIG. 11, the computational procedure of the PSO technique is summarized as follows:

Process 701: the iteration indices NOI=0, J=0, are initialized.

Process 702: each particle position is initialized.

Process 704: Determination of initial values for best values.

Process 706: Determination of model's response with a selected particle position.

Process 708: Determination of the fitness function to check the best particle based on the model's responses obtained and the recorded responses. If it is better, update the best particle. In the case of the parameters for Inertia H, as addressed, the simulation parameters and equations 28 and 29 apply to this process.

Process 710: Until all particles are calculated in step 710, increment a particle counter 711 and repeat steps 704, 706 and 708 for each particle.

Process 712: Update new particle position and velocity.

Process 714: Determine whether the maximum number of iterations has been reached. If the maximum number of iterations has not been reached go to Process 716. If it has been reached, go to Process 717.

Process 716, increment an iteration counters (NOI and I)

Process 717: If the index J is 50, go to step 702. If not, go to step 704.

At the end of the iterative process, the global best value for each of the six parameters contains the closest estimation of the parameter value.

Process 708: Compare Estimated Values to Received and Stored Manufacturer Values and Variances.

From this process, the best estimated values for H, $T_A$, $K_P$, $K_I$, $W_{nft}$, and Droop are produced and compared to the manufacturer's values for each as described with reference to FIG. 7.

In one exemplary embodiment, in one test the estimated generating system inertia constant H was confirmed with a partial load rejection test. As shown in FIG. 12, this one test result reflected a calculated unit generating system inertia value H of 5.95 MW-s/MVA. This Step 3 calculated value of the generating system inertia constant H matches the manufacturer provided data. The generating system inertia H can be used to scale the active power input to the integral of accelerating power PSS. The derived compensated frequency of is that which is referred in equation (6) above.

Figure 13:
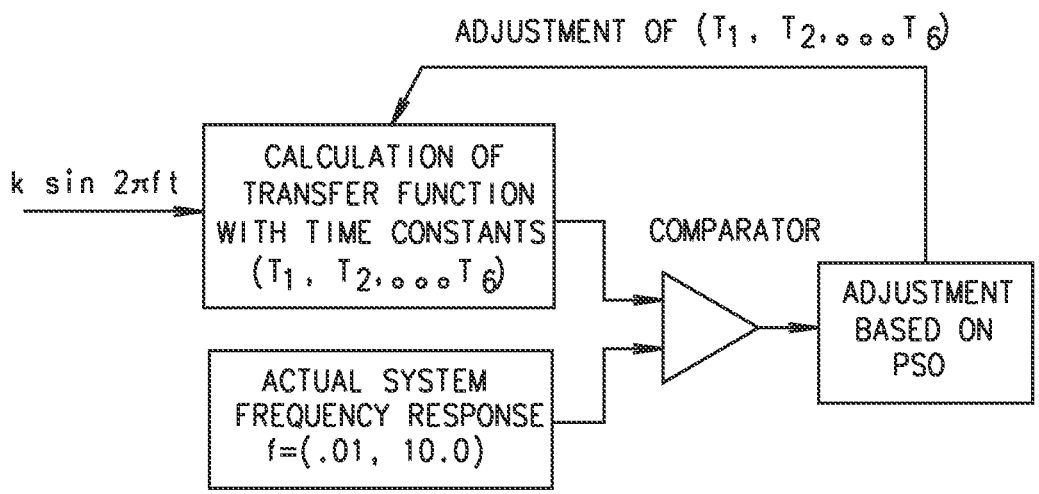
FIG. 13 is a diagram of a flow chart of a particle swarm optimization (PSO) process to generate estimated Phase Compensation Time Constants in an automatic PSS parameter generation control system for use with an integral of accelerating power PSS according to one exemplary embodiment.

2.1.4 Step 4: Determining the Lead-Lag Phase Compensation Time Constants $T_1$-$T_6$ In order to determine lead-lag time constants of the phase compensation, three sub-steps are described that includes and initial frequency response test. First, a pseudo white noise test input is applied to the AVR summing point for about one minute and the test input and the generator voltage $V_t$ are recorded. The variation/change in the terminal voltage $\Delta V_t$ can therefore be determined. Second, the recorded signals are used to obtain frequency response of the uncompensated system using Fast Fourier Transform (FFT). Third, the phase compensation time constants $T_1$, $T_2$, . . . , $T_6$ are determined in order to obtain a compensated phase curve that is near zero (0 to about 30 degrees) over the frequency range in which most power oscillations exist, i.e., from 0.1 to 3 Hz. It is should be understood to those skilled in the art that it is impossible to make or be near zero over the frequency range of 0.1 to 3 Hz. For most instances, an amount of up to about 30 degrees has been found to be satisfactory for this process, though another value could also be possible. These phase compensation time constants are determined using the PSO technique as shown in FIG. 13 and using a similar process as described above in regard to FIG. 11. Further, it should be known to those of skill in the art that the maximum magnitude of the pseudo white noise that is input is limited to an amount that ensures a linear or otherwise stable AVR response.

The PSO technique as used and described above as to Step 3 is utilized in Step 4 with the exception that the calculation of the phase compensation of the lead-lag filters with $T_1$, $T_2$, . . . , $T_6$ is adjusted by PSO in the following equation for transfer function G(s) for the lead-lag filters:

$$G(s) = \frac{T_1 s + 1}{T_2 s + 1} \frac{T_3 s + 1}{T_4 s + 1} \frac{T_5 s + 1}{T_6 s + 1} \quad (31)$$

When the compensated phase curve becomes near zero over the power oscillation frequency range from 0.1 to 3 Hz, the estimated time constants are set for the PSS parameters.

From this the estimated phase compensation time constants $T_1$, $T_2$, . . . , $T_6$ are generated by the method and system for input as PSS parameters.

Figure 14A:
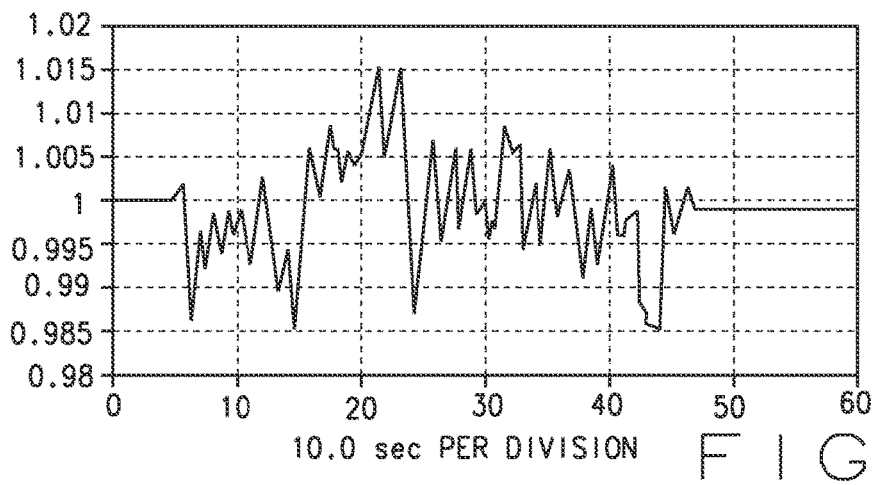
FIGS. 14(a), 14(b) and 14(c), are graphs generated from tests of the automatic PSS parameter input controller for the phase compensation of Step 4, with FIG. 14(a) illustrating the voltage variation, FIG. 14(b) illustrating the active power variation, and FIG. 14(c) illustrating the phase lag and compensated phase for use with an integral of accelerating power PSS according to one exemplary embodiment.
Figure 14B:
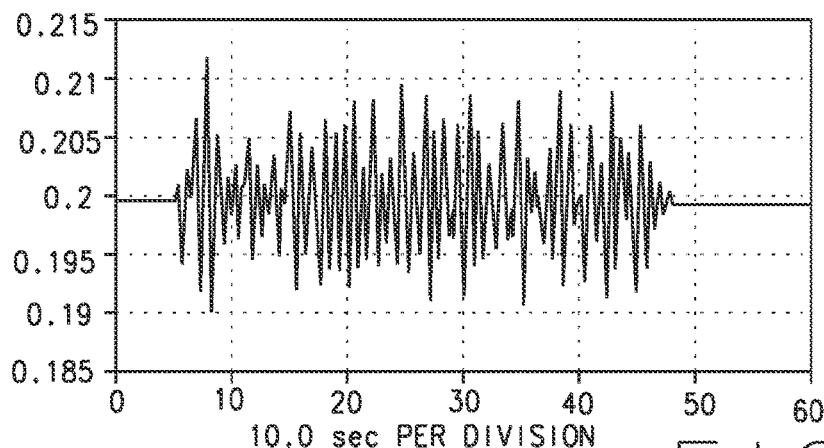
Figure 14C:
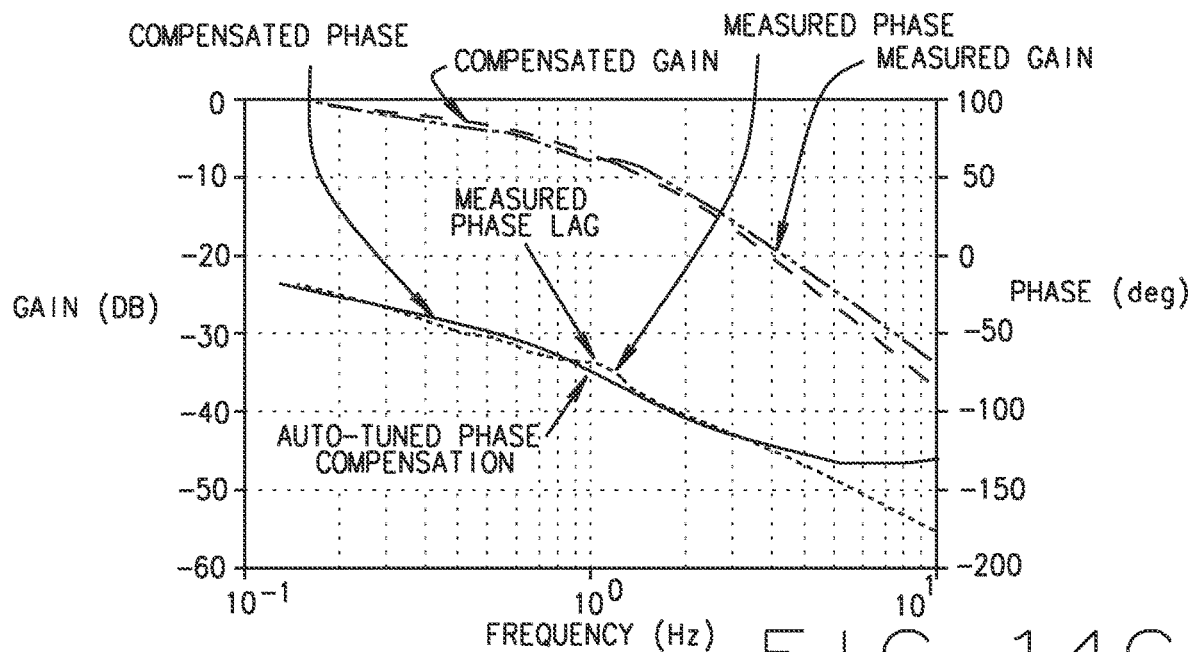

In one exemplary embodiment, using the process described as Step 4, the phase lead-lag parameters $T_1$, $T_2$, . . . , $T_6$ were automatically calculated based on PSO using measured pseudo white noise input and generator voltage outputs, i.e., the variation/change in the terminal voltage $\Delta V_t$. FIGS. 14(a) and 14(b) illustrate the generator voltage $E_t$ and real electro-mechanical power $P_e$ resulting from one test. The calculated time constants of the lead-lag phase compensation time constants were $T_1$=0.1, $T_2$=0.02, $T_3$=0.2, $T_4$=0.005, $T_5$=0.2, and $T_6$=0.005. FIG. 14(c) illustrates the calculated frequency response of lead-lag block and required phase compensation.

2.1.5 Step 5: Determining PSS Gain $K_s$

The last step, Step 5, of the method for automatically tuned PSS parameter input controller for use with an integral of accelerating power is the determination of the PSS gain $K_s$. The Step 5 process produces a value for the PSS gain $K_s$ that is set at a value well below the limit at which the exciter mode is unstable. The GM can be also be a predetermined gain margin that is determined to be desirable, such as by way of example, one third of the limit at which the exciter mode is unstable.

In order to generate such an initial PSS gain $K_s$ for commissioning a generator, the open loop frequency response is utilized to estimate the gain margin based on the open loop frequency response from the white noise input to the AVR summing point to the PSS output with the compensated lead-lag filters.

Figure 16:
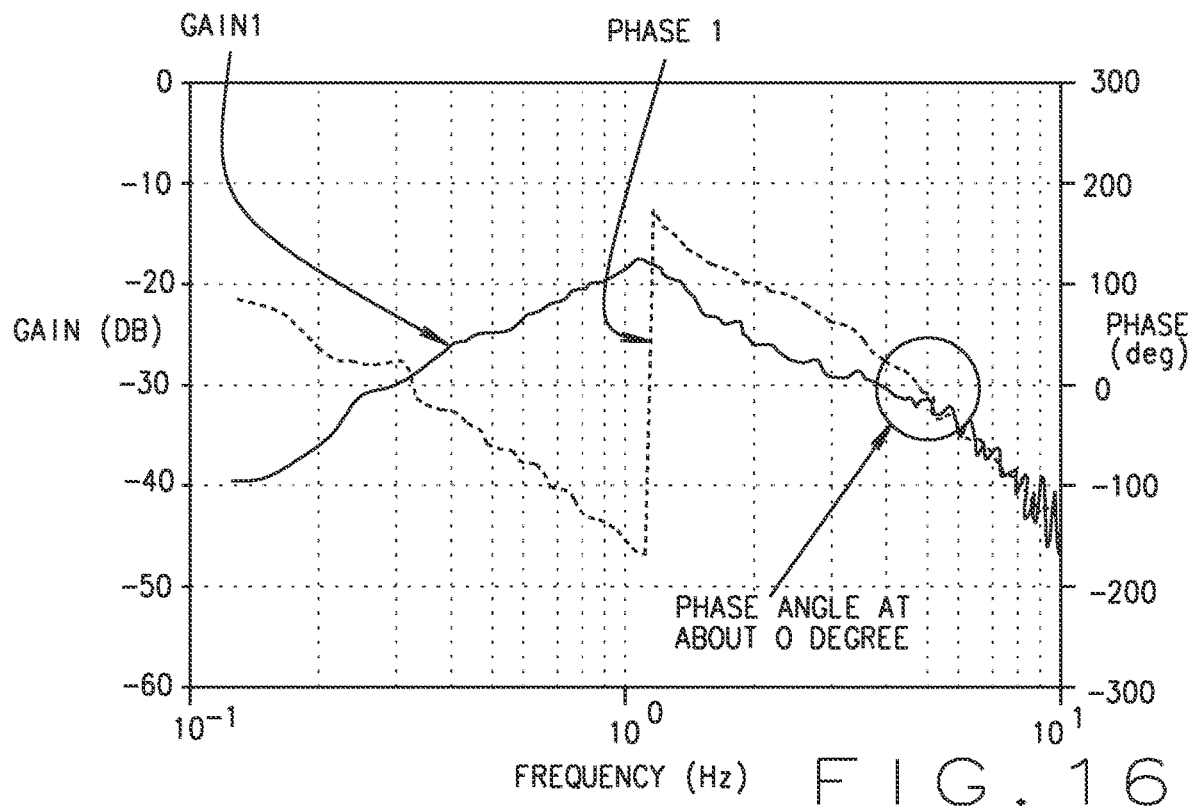
FIG. 16 is a graph illustrating a calculation of gain and phase of the open loop frequency response from 0.1 Hz to 10.0 Hz from a test of an automatic PSS parameter input controller for use with an integral of accelerating power PSS according to one exemplary embodiment.

Since the PSS output is added positive into the AVR summing point, the gain margin is determined at the phase crossover frequency with zero degree. Thus, if 10 dB gain margin is desired, i.e., one third of instability gain, the PSS gain is calculated as follow:

$$K_{s1} = 10^{GM-10} \quad (32)$$

Where GM is gain margin obtained with open loop frequency response with $K_{s1}=1$. As shown in FIG. 16, the gain margin GM is calculated when the phase angle is zero degree for the positive feedback system.

With the Step 4 generated phase compensations, the damping is added as stabilizer gain (Ks) is increased. If stabilizer gain is increased to the value where the exciter mode crosses into the right half plane of the s-domain, it causes system instability. This value is verified during the commissioning of the PSS from the gain margin GM assuming a linear system. However, as one of skill in the art should understand, as the power generating system is not linear, the gain can be reduced to about one-third of the instability gain. The final value gain setting is selected as 15, which is three times less than the instability gain which is generally known in the industry.

Figure 1:
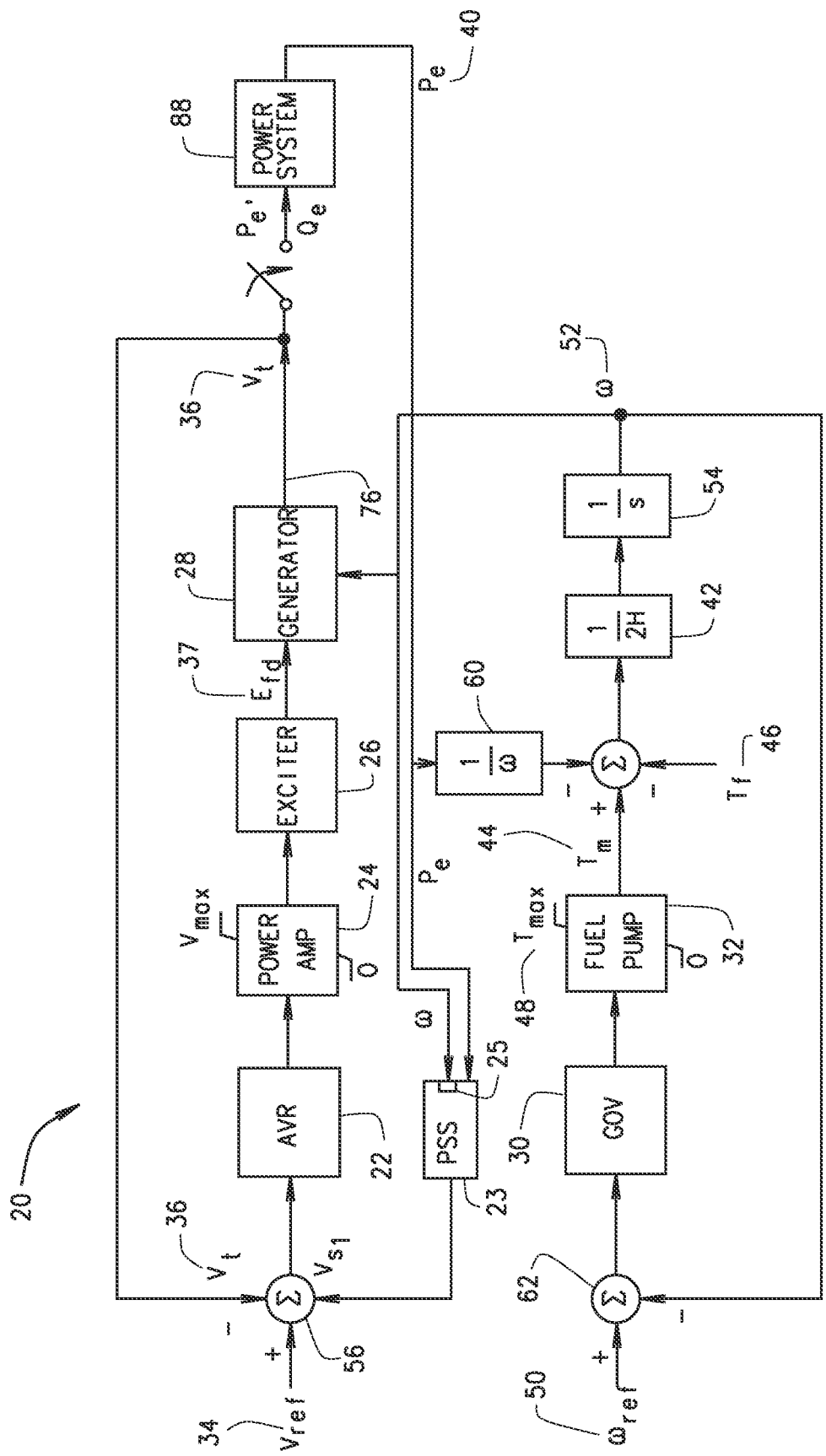
FIG. 1 is a block diagram simplified generating system model with cross coupling when a power generating system is connected to a power system according to the Prior Art.

FIG. 15 provides a block diagram for the current system as compared to that of the prior art as shown in FIG. 1. As shown, the commissioning control system 100 is communicatively coupled to the PSS 23 by PSS input interface 25 for providing the PSS 23 with its initial set of PSS parameters. For commissioning, the output of the PSS 23 that provides for $V_S$ is not connected to the summing point 56 of the AVR 22.

FIG. 16 illustrates the open loop frequency response from 0.1 Hz to 10.0 Hz. FIG. 16 shows the gain and phase of the open loop frequency response.

Figure 17A:
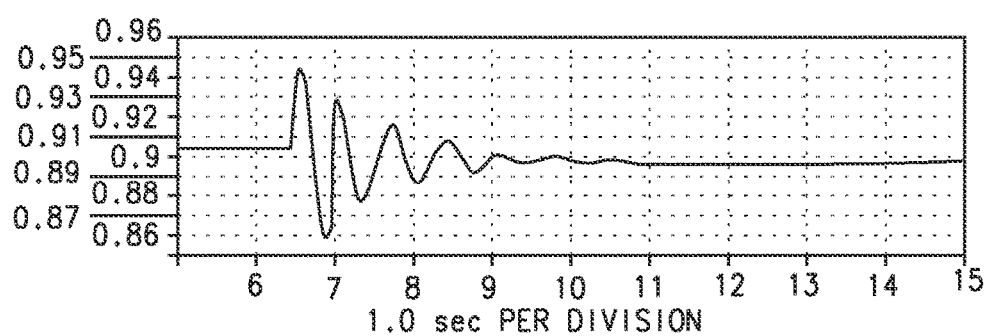
FIGS. 17(a) and 17(b) are real power response graphs comparing in FIG. 17(a) a test of the prior art system to FIG. 17(b) the effectiveness of an automatic PSS parameter input controller for use with an integral of accelerating power PSS according to one exemplary embodiment.
Figure 17B:
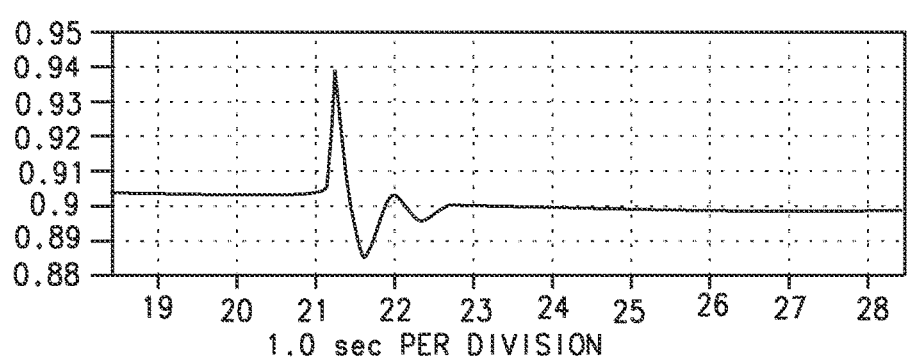

The test results in the graphs of FIG. 17 illustrate the real time response of the synchronous machine during commissioning and clearly show the immediate effects of the power system stabilizer as disclosed herein. FIG. 17(a) is a graph recording illustrates the machine MWs without the presently disclosed automatic PSS parameter input controller PSS when 2% voltage step is applied. In contrast, FIG. 17(b) is a graph illustrating the test results of a machine MWs with disclosed automatic PSS parameter input controller for the PSS when 2% voltage step is applied. As can be seen, there is significant improvements in the performance of the generating system when using the disclosed automatic PSS parameter input controller when commissioning a generating system having an integral of accelerating power PSS as an input to the AVR.

4. Computer Environment

Referring to FIG. 18, an operating environment for an illustrated embodiment of a system and/or method for detecting an incipient failure in a generator as described herein is a computer system 1000 with a computer 1002 that comprises at least one high speed central processing unit (CPU) 1004, in conjunction with a memory system 1006 interconnected with at least one bus structure 1008, an input device 1010, and an output device 1012. These elements are interconnected by at least one bus structure 1008. The memory system 1006 includes nontransient memory storing computer executable instructions for enabling and instructing the computer 1002 for performing the methods as described herein.

As addressed above, the input and output devices can include a communication interface including a graphical user interface. Any or all of the computer components of the network interface and communications systems and methods can be any computing device including, but not limited to, a lap top, PDA, Cell/mobile phone, as well as potentially a dedicated device. In one embodiment, the presently disclosed method and system can be software that is implemented as any "app" thereon and considered within the scope of this disclosure.

The illustrated CPU 1004 for a system for detecting an incipient failure of a generator is of familiar design and includes an arithmetic logic unit (ALU) 1014 for performing computations, a collection of registers 1016 for temporary storage of data and instructions, and a control unit 1018 for controlling operation of the computer system 1000. Any of a variety of processors, including at least those from Digital Equipment, Sun, MIPS, Motorola, NEC, Intel, Cyrix, AMD, HP, and Nexgen, is equally preferred but not limited thereto, for the CPU 1004. This illustrated embodiment operates on an operating system designed to be portable to any of these processing platforms.

The memory system 1006 generally includes high-speed main memory 1020 in the form of a medium such as random access memory (RAM) and read only memory (ROM) semiconductor devices that are typical on a non-transient computer recordable medium. The present disclosure is not limited thereto and can also include secondary storage 1022 in the form of long term storage mediums such as floppy disks, hard disks, tape, CD-ROM, flash memory, etc., and other devices that store data using electrical, magnetic, and optical or other recording media. The main memory 1020 also can include, in some embodiments, a video display memory for displaying images through a display device (not shown). Those skilled in the art will recognize that the memory system 1006 can comprise a variety of alternative components having a variety of storage capacities.

Where applicable, an input device 1010, and output device 1012 can also be provided in the system as described herein or embodiments thereof. The input device 1010 can comprise any keyboard, mouse, physical transducer (e.g. a microphone), and can be interconnected to the computer 1002 via an input interface 1024, such as a graphical user interface, associated with or separate from the above described communication interface including the antenna interface for wireless communications. The output device 1012 can include a display, a printer, a transducer (e.g. a speaker), etc., and be interconnected to the computer 1002 via an output interface 1026 that can include the above described communication interface including the antenna interface. Some devices, such as a network adapter or a modem, can be used as input and/or output devices.

As is familiar to those skilled in the art, the computer system 1000 further includes an operating system and at least one application program. The operating system is the set of software which controls the computer system's operation and the allocation of resources. The application program is the set of software that performs a task desired by the method of detecting an incipient error in a generator and or any of the above described processes and process steps using computer resources made available through the operating system.

In accordance with the practices of persons skilled in the art of computer programming, the present disclosure is described below with reference to symbolic representations of operations that are performed by the computer system 1000. Such operations are sometimes referred to as being computer-executed. It will be appreciated that the operations which are symbolically represented include the manipulation by the CPU 1004 of electrical signals representing data bits and the maintenance of data bits at memory locations in the memory system 1006, as well as other processing of signals. The memory locations where data bits are maintained are physical locations that have particular electrical, magnetic, or optical properties corresponding to the data bits. One or more embodiments can be implemented in tangible form in a program or programs defined by computer executable instructions that can be stored on a computer-readable medium. The computer-readable medium can be any of the devices, or a combination of the devices, described above in connection with the memory system 1006.

As described herein by the various embodiments, a system and method for producing initial PSS parameters are provided that provides for the commissioning of a generator very quickly with excellent performance results. As described, after verifying the manufacturer data, the PSS parameters can be estimated quickly using the described PSO performance parameter estimation methods that when input into the PSS, can provide for the commissioning of a generator an extremely short time as compared to prior methods and systems.

When describing elements or features and/or embodiments thereof, the articles "a", "an", "the", and "said" are intended to mean that there are one or more of the elements or features. The terms "comprising", "including", and "having" are intended to be inclusive and mean that there can be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps can be employed.

What is claimed is:

1. A system for automatically tuning/configuring an integral of accelerating power type power system stabilizer (PSS) in a digital excitation control system that is controlling a grid-connected power generator system having a prime mover system providing rotational energy to a generator having an exciter, a plurality of sensors for measuring operational characteristics of the power system, an automatic voltage regulator (AVR) having an input summing point and generating control parameters of the exciter and the generator, the PSS having a memory, a processor, computer executable instructions, a communication control interface for receiving PSS parameters, and an output for generating a control output to the AVR input summing point, the system comprising:
a control module having a processor, a memory, stored computer executable instructions, a control input, and a control output, the computer executable instructions including instructions for configuring the control module for:
a. generating a set of tuning PSS lead-lag phase compensation time constants, the generating including:
receiving a set of generated terminal voltages during an operation of the grid-connected power generator system;
generating an uncompensated frequency response of the grid-connected power generator system as a function of the received set of generated terminal voltages; and
determining the set of tuning phase compensation time constants includes performing particle swarm optimization (PSO) as a function of the generated uncompensated frequency response;
b. generating a tuning PSS gain value, the generating including:
determining an open loop frequency response of the grid-connected power generator system to determine a PSS gain margin; and
determining a tuning PSS gain as a function of the determined PSS gain margin; and
c. transmitting the determined set of tuning phase compensation time constants and the determined tuning PSS gain value from the control output to the communication control interface of the PSS.

2. The system of claim 1 wherein the generating of the uncompensated frequency response of the grid-connected power generator system to generate a set of lead-lag phase compensation time constants further includes:
performing a frequency response test on the grid-connected power generator system that includes measuring a parameter of the generator, applying a pseudo white noise to the AVR input summing point and measuring the applied pseudo white noise and the generator parameter resulting from the applied pseudo white noise;
wherein the control module is configured for performing the particle swarm optimization (PSO) to the measured parameters of the frequency response test.

3. The system of claim 1 wherein generating a set of lead-lag phase compensation time constants, includes:
operating the power system with the generator in an on-line mode; and
measuring the set of generated terminal voltages;
wherein the control module is configured for generating the uncompensated frequency response as a function of the generated terminal voltages using Fast Fourier Transform (FFT).

4. The system of claim 3 wherein generating the set of lead-lag phase compensation time constants further includes:
recording a set of baseline generator voltages $V_t$;
applying a pseudo white noise to the AVR input summing point;
recording the applied pseudo white noise; and
recording a set of induced noise voltages $\Delta V_t$ with the pseudo white noise applied;
wherein the control module is configured for generating the uncompensated frequency response using FFT as a function of the set of induced noise voltages and the recorded applied pseudo white noise.

5. The system of claim 1 wherein the set of tuning lead-lag phase compensation time constants are constants $T_1$, $T_2$, $T_3$, $T_4$, $T_5$, and $T_6$.

6. The system of claim 1 wherein the control module is configured for generating the set of tuning lead-lag phase compensation time constants as a function of a compensated phase curve being between zero and about 30 degrees over a frequency range from about 0.1 Hz to about 3.0 Hz.

7. The system of claim 4 wherein the control module is configured for determining the set of tuning phase compensation time constants by performing particle swarm optimization (PSO) as a function of the uncompensated frequency response resulting from the applied pseudo white noise.

8. The system of claim 1 wherein the generating of the tuning PSS gain value includes
performing a frequency response test on the grid-connected power generator system that includes measuring a parameter of the generator, applying a pseudo white noise to the AVR input summing point and measuring the applied pseudo white noise and the generator parameter resulting from the applied pseudo white noise.

9. The system of claim 8 wherein the control module is configured for determining of the tuning PSS gain by applying a predetermined gain margin to the measured parameters of the frequency response test to determine the PSS gain margin.

10. The system of claim 1 wherein determining of the open loop frequency response includes:
applying a pseudo white noise to an AVR input summing point; and
wherein the control module is configured for
applying compensated lead-lag filters;
wherein determining the PSS gain margin as a function of the phase crossover frequency being zero degrees.

11. The system of claim 10 wherein the determining of the open loop frequency response includes the control module being configured for:
determining a change to a reference voltage input to the AVR input summing point resulting from the applied pseudo white noise;
determining a change in a PSS output resulting from the applied pseudo white noise; and
determining a change to the PSS gain resulting from the applied pseudo white noise;
wherein the control module is configured for generating the open loop frequency response using Fast Fourier Transform (FFT) as a function of the PSS output and the recorded applied pseudo white noise.

12. The system of claim 11 wherein the control module is configured for determining the change to the PSS gain resulting from the applied pseudo white noise by calculating the gain margin from the open loop frequency response using FFT as a function of the determined change in the PSS output resulting from the applied pseudo white noise.

13. The system of claim 12 wherein the PSS gain margin is determined to be one third of the determined change to the PSS gain resulting from the applied pseudo white noise.

14. The system of claim 1, wherein the control module is further configured for:
receiving at the control input a set of configuration data associated with the grid-connected power generator system including component data for the prime mover system, the generator, the AVR and the PSS; and
receiving at the PSS control input a value for each of a plurality of operational parameters associated with the power system the plurality of operational parameters selected from a group of parameters including washout time constant, generating system inertia, quadrature axis reactance/impedance, phase compensation time constants, and PSS gain; and
storing the received operational parameter value for each of the plurality of received operational parameters in the memory,
wherein the at least one of the generating of the tuning PSS lead-lag phase compensation time constants and the tuning PSS gain value is a function of the received operational parameter values.

15. The system of claim 14 wherein the control module is further configured for:
generating an estimated value for at least one of the received power system operational parameters; and
comparing the estimated value to the received manufacturer value for the at least operational parameter,
wherein the at least one of the generating of the tuning PSS lead-lag phase compensation time constants and the tuning PSS gain value is a function of the generated estimated value and not the received manufacturer value.

16. The system of claim 15 wherein the received operational parameter is a saturation coefficient, further comprising:
measuring a set of generator field currents and terminal voltages at various generator operational power units,
wherein and the control module is configured for generating an estimated value for the saturation coefficient by applying a recursive least squares operation to the measured generator terminal voltages and field currents.

17. The system of claim 15 wherein the received operational parameters are generator data parameters, and wherein generating an estimated value for the generator data parameters includes parameters selected from a group consisting of: synchronous reactance, transient reactance, and transient time constant.

18. The system of claim 15 wherein the received operational parameter is a synchronous reactance $X_d$, and wherein generating an estimated value for a compensating synchronous reactance $X\hat{}_d$ includes:
operating the generator online and connected to a grid load, but without real power being exported;
measuring numerous generator terminal voltages in step tests;
determining reactive powers at steady-state condition; and
wherein the control module is configured for:
generating an estimated value for an estimated generator synchronous reactance as a function of the measured terminal voltages and the determined reactive powers.

19. The system of claim 15 wherein the received operational parameter is a synchronous reactance $X_d$, and wherein generating a tuning value for the compensating synchronous reactance $X\hat{}^d$ includes:
about five voltage step tests.

20. The system of claim 15 wherein the control module is configured for generating a compensating reactance q-axis synchronous reactance $X_{qcomp}$ that is one third of the generated tuning value for the generator synchronous reactances $X_q$.

21. The system of claim 15 wherein the received operational parameter is a generating system inertia, and wherein generating an estimated value for the generating system inertia is a function of a fuel pump time constant $T_A$, governor proportional gain $K_P$, governor integral gain $K_I$, fuel consumed at no-load $W_{nfl}$, and Droop.

22. The system of claim 15, further comprising generating an estimated value for a compensating frequency, including, during operation of the generator:
measuring a frequency of the generator;
measuring a real power at the output of the generator;
measuring a terminal current at the output of the generator; and
receiving the generator stator resistance;
wherein the control module is configured for generating an estimated compensating frequency as a function of the measured generator frequency, measured real power, measured terminal current, and received generator stator resistance.

23. The system of claim 15 wherein the control module is further configured for:
generating an estimated value for a compensating frequency as function of a generating system inertia H, a fuel pump time constant $T_A$, a governor proportional gain $K_P$, a governor integral gain $K_I$, a fuel consumed at no-load $W_{nfl}$, and a Droop.

24. The system of claim 23, further comprising;
during operation of the generator, measuring generating system inertia H, fuel pump time constant $T_A$, governor proportional gain $K_P$, governor integral gain $K_I$, fuel consumed at no-load $W_{nfl}$, and Droop; and
comparing the estimated values to the measured values for each generator parameter to determine if they match or do not match;
where the estimated values match the measured values, determining the compensating frequency as a function of the estimated values; and
where the estimated values do not match the measured values, adjusting each of the generator parameter values using particle swarm optimization (PSO) to determine adjusted estimated parameter values for each parameter and determining the compensating frequency as a function of the adjusted estimated parameter values.

25. The system of claim 15, further comprising:
estimating washout time constant $T_w$.

26. The system of claim 25 wherein estimating the washout time constant $T_w$ includes:
applying a pseudo white noise signal to the AVR input summing point;
increasing the real power of the generator;
measuring a generator frequency ω, three phase generator terminal voltages $V_t$, and terminal currents $I_t$, during the increasing with the pseudo white noise signal applied;
applying Fast Fourier Transform (FFT) of the measured real power variation resulting from the applied pseudo white noise;
identifying the largest frequency component; and
generating the tuning washout time constant Tw as a function of the identified largest frequency component.

27. The system of claim 26 wherein generating the washout time constant $T_w$ is multiplying the identified largest frequency component by a predetermined multiplier.

28. The system of claim 27 wherein the predetermined multiplier is five.

29. The system of claim 1, further comprising generating an estimated generating system inertia H by performing particle swarm optimization (PSO).

30. The system of claim 29, wherein generating the estimated generating system inertia includes:
performing a partial load rejection test on the generator to produce a measured value for each of a plurality of generating system inertia related parameters; wherein performing the particle swarm optimization (PSO) on each of a set of generating system inertia related parameters for generating the estimated value for the generating system inertia.

31. The system of claim 29 wherein particle swarm optimization (PSO) is used for one or more generating system inertia H related parameter selected from the list consisting of generating system inertia H, fuel pump time constant $T_A$, governor proportional gain $K_P$, governor integral gain $K_I$, fuel consumed at no-load $W_{nfl}$, and Droop.

32. A method for automatically tuning/configuring an integral of accelerating power type power system stabilizer (PSS) in a digital excitation control system that is controlling a grid-connected power generator system having a prime mover system providing rotational energy to a generator having an exciter, a plurality of sensors for measuring operational characteristics of the power system, an automatic voltage regulator (AVR) having an input summing point and generating control parameters of the exciter and the generator, the PSS having a memory, a processor, computer executable instructions, a communication control interface for receiving PSS parameters, and an output for generating a control output to the AVR input summing point, in a control module having a processor, a memory, stored computer executable instructions, a control input, and a control output, the method comprising:
generating a set of tuning PSS lead-lag phase compensation time constants including receiving a set of generated terminal voltages during an operation of the grid-connected power generator system generating an uncompensated frequency response of the grid-connected power generator system as a function of the received set of generated terminal voltages, and determining the set of tuning phase compensation time constants including performing particle swarm optimization (PSO) as a function of the generated uncompensated frequency response;
generating a tuning PSS gain value including determining an open loop frequency response of the grid-connected power generator system to determine a PSS gain margin and determining a tuning PSS gain as a function of the determined PSS gain margin; and
transmitting the determined set of tuning phase compensation time constants and the determined tuning PSS gain value from the control output to the communication control interface of the PSS.

33. The method of claim 32, further comprising:
performing a frequency response test on the grid-connected power generator system that includes measuring a parameter of the generator, applying a pseudo white noise to the AVR input summing point and measuring the applied pseudo white noise and the generator parameter resulting from the applied pseudo white noise;
wherein performing the particle swarm optimization (PSO) to the measuring the applied pseudo white noise and the generator parameter resulting from the applied pseudo white noise.

34. The method of claim 33 wherein generating a set of lead-lag phase compensation time constants, includes:
operating the power system with the generator in an on-line mode;
measuring the set of generated terminal voltages;
wherein in the control module, generating the uncompensated frequency response as a function of the generated terminal voltages using Fast Fourier Transform (FFT).

35. The method of claim 33 wherein the generating the set of lead-lag phase compensation time constants further includes:
recording a set of baseline generator voltages $V_t$;
applying a pseudo white noise to the AVR input summing point;
recording the applied pseudo white noise; and
recording a set of induced noise voltages $\Delta V_t$ with the pseudo white noise applied;
wherein in the control module, generating the uncompensated frequency response using Fast Fourier Transform (FFT) as a function of the set of induced noise voltages and the recorded applied pseudo white noise.

36. The method of claim 32 wherein generating the set of tuning lead-lag phase compensation time constants as a function of a compensated phase curve being between zero and about 30 degrees over a frequency range from about 0.1 Hz to about 3.0 Hz.

37. The method of claim 35 wherein determining the set of tuning phase compensation time constants by performing particle swarm optimization (PSO) as a function of the uncompensated frequency response resulting from the applied pseudo white noise.

38. The method of claim 32, further comprising:
performing a frequency response test on the grid-connected power generator system that includes measuring a parameter of the generator, applying a pseudo white noise to the AVR input summing point and measuring the applied pseudo white noise and the generator parameter resulting from the applied pseudo white noise, and
determining of the tuning PSS gain by applying a predetermined gain margin to the measured parameters of the frequency response test to determine the PSS gain margin.

39. The method of claim 32, further comprising:
generating an estimated generating system inertia H by performing particle swarm optimization (PSO).

40. The method of claim 39, wherein generating the estimated generating system inertia includes:
performing a partial load rejection test on the generator to produce a measured value for each of a plurality of generating system inertia related parameters; wherein performing the particle swarm optimization (PSO) on each of a set of generating system inertia related parameters for generating the estimated value for the generating system inertia.

41. The method of claim 39 wherein performing particle swarm optimization (PSO) includes performing PSO on one or more generating system inertia H related parameter selected from the list consisting of generating system inertia H, fuel pump time constant $T_A$, governor proportional gain $K_P$, governor integral gain $K_I$, fuel consumed at no-load $W_{nfl}$, and Droop.

42. A computer readable medium having computer executable instructions configured to cause a computing system to a method comprising:
generating a set of tuning PSS lead-lag phase compensation time constants including receiving a set of generated terminal voltages during an operation of a power system, generating an uncompensated frequency response of the grid-connected power generator system as a function of the received set of generated terminal voltages, and determining the set of tuning phase compensation time constants including performing particle swarm optimization (PSO) as a function of the generated uncompensated frequency response;
generating a tuning PSS gain value including determining an open loop frequency response of the grid-connected power generator system to determine a PSS gain margin and determining a tuning PSS gain as a function of the determined PSS gain margin; and
transmitting the determined set of tuning phase compensation time constants and the determined tuning PSS gain value from an control output to a communication control interface of a power system stabilizer (PSS) in a digital excitation control system that is controlling the power system through use of an automatic voltage regulator (AVR).

43. The computer readable medium of claim 42 having computer executable instructions configured to further cause the computing system to perform the steps comprising:
performing the particle swarm optimization (PSO) to a set of measured applied pseudo white noise to a measuring summing point of the AVR and measured generator parameter resulting from the applied pseudo white noise.

44. The computer readable medium of claim 43 having computer executable instructions configured to further cause the computing system to perform the steps comprising:
receiving a measured set of generated terminal voltages when operating the power system with the generator in an on-line mode; and
generating the uncompensated frequency response as a function of the generated terminal voltages using Fast Fourier Transform (FFT).

45. The computer readable medium of claim 43 having computer executable instructions configured to further cause the computing system to perform the steps comprising:
receiving a recorded set of baseline generator voltages $V_t$;
receiving recorded applied pseudo white noise when a pseudo white noise is applied to the AVR input summing point;
receiving a recorded set of induced noise voltages $\Delta V_t$ when the pseudo white noise was applied; and
generating the uncompensated frequency response using FFT as a function of the set of induced noise voltages and the recorded applied pseudo white noise.

46. The computer readable medium of claim 43 includes computer executable instructions for generating the set of tuning lead-lag phase compensation time constants as a function of a compensated phase curve being between zero and 30 degrees over a frequency range from about 0.1 Hz to about 3.0 Hz.

47. The computer readable medium of claim 43 includes computer executable instructions for determining the set of tuning phase compensation time constants by performing particle swarm optimization (PSO) as a function of the uncompensated frequency response resulting from the applied pseudo white noise.

48. The computer readable medium of claim 42 having computer executable instructions configured to cause further cause the computing system to perform the steps comprising:
receiving a frequency response test measurement set on the grid-connected power generator system that includes a measured parameter of the generator, and measured applied pseudo white noise and the generator parameter resulting from the applied pseudo white noise; and
determining of the tuning PSS gain by applying a predetermined gain margin to the measured parameters of the received frequency test measurement set in the determining of the PSS gain margin.

49. The computer readable medium of claim 42 having computer executable instructions configured to cause further cause the computing system to perform the steps comprising:
generating an estimated generating system inertia H by performing particle swarm optimization (PSO).

50. The computer readable medium of claim 49 having computer executable instructions configured to cause further cause the computing system to perform the steps comprising:
receiving a produced measured value for each of a plurality of generating system inertia H related parameters resulting from performing a partial load rejection test on the generator,
wherein the computer readable medium is configured for performing the particle swarm optimization (PSO) on each of a set of generating system inertia related parameters for generating the estimated value for the generating system inertia H.

51. The computer readable of claim 49 having computer executable instructions configured to further cause the computing system to perform the steps comprising:
wherein performing particle swarm optimization (PSO) includes performing the PSO on one or more generating system inertia H related parameter selected from the list consisting of generating system inertia H, fuel pump time constant $T_A$, governor proportional gain $K_P$, governor integral gain $K_I$, fuel consumed at no-load $W_{nfl}$, and Droop.

52. The method of claim 32, further comprising:
receiving at the control input a set of configuration data associated with the grid-connected power generator system including component data for the prime mover system, the generator, the AVR and the PSS;
receiving at the PSS control input a value for each of a plurality of operational parameters associated with the power system the plurality of operational parameters selected from a group of parameters including washout time constant, generating system inertia, quadrature axis reactance/impedance, phase compensation time constants, and PSS gain; and
storing the received operational parameter value for each of the plurality of received operational parameters in the memory,
wherein the at least one of the generating of the tuning PSS lead-lag phase compensation time constants and the tuning PSS gain value is a function of the received operational parameter values, generating an estimated value for at least one of the received power system operational parameters;
generating an estimated value for at least one of the received power system operational parameters; and
comparing the estimated value to the received manufacturer value for the at least operational parameter,
wherein the at least one of the generating of the tuning PSS lead-lag phase compensation time constants and the tuning PSS gain value is a function of the generated estimated value and not the received manufacturer value.

53. The method of claim 52 further comprising:
measuring a set of generator field currents and terminal voltages at various generator operational power units,
wherein and the control module is configured for generating an estimated value for the saturation coefficient by applying a recursive least squares operation to the measured generator terminal voltages and field currents,
wherein the received operational parameters are generator data parameters, and wherein generating an estimated value for the generator data parameters includes parameters selected from a group consisting of: synchronous reactance, transient reactance, and transient time constant,
wherein the received operational parameter is a synchronous reactance $X_d$, and wherein generating an estimated value for a compensating synchronous reactance $X^{\wedge}_d$ includes:
operating the generator online and connected to a grid load, but without real power being exported;
measuring numerous generator terminal voltages in step tests;
determining reactive powers at steady-state condition; and wherein the control module is configured for:
generating an estimated value for an estimated generator synchronous reactance as a function of the measured terminal voltages and the determined reactive powers.

54. The method of claim 52 further comprising generating an estimated value for a compensating frequency, including, during operation of the generator:
measuring a frequency of the generator;
measuring a real power at the output of the generator;
measuring a terminal current at the output of the generator; and
receiving the generator stator resistance;
wherein the control module is configured for generating an estimated compensating frequency as a function of the measured generator frequency, measured real power, measured terminal current, and received generator stator resistance, and
wherein the control module is further configured for:
generating an estimated value for a compensating frequency as function of a generating system inertia H, a fuel pump time constant $T_A$, a governor proportional gain $K_P$, a governor integral gain $K_I$, a fuel consumed at no-load $W_{nfl}$, and a Droop.

55. The system of claim 1 wherein the control module is configured for the determining of the open loop frequency response as a function of generating system inertia (H) and as a function of estimating washout time constant ($T_w$).

56. The system of claim 55 wherein the control module is configured for the determining of the open loop frequency response as a function of generating compensating reactance ($X_{qcomp}$).

57. The system of claim 1 wherein the control module is configured for the determining of the open loop frequency response as a function of generating compensating reactance ($X_{qcomp}$) and as a function of estimating washout time constant ($T_w$).

58. The system of claim 57 wherein the control module is configured for the determining of the open loop frequency response by applying pseudo white noise to an AVR summing point and wherein the control module is configured for generating the open loop frequency response using Fast Fourier Transform (FFT) as a function of the PSS output and the applied pseudo white noise.

59. The method of claim 32, further comprising:
in the step of generating a tuning PSS gain value including determining an open loop frequency response of the grid-connected power generator system to determine a PSS gain margin and determining a tuning PSS gain as a function of the determined PSS gain margin, the determining of the open loop frequency response is as a function of generating system inertia (H) and as a function of estimating washout time constant ($T_w$).

60. The method of claim 59, further comprising:
in the step of generating a tuning PSS gain value including determining an open loop frequency response of the grid-connected power generator system to determine a PSS gain margin and determining a tuning PSS gain as a function of the determined PSS gain margin the determining of the open loop frequency response is as a function of generating compensating reactance ($X_{qcomp}$).

61. The method of claim 32, further comprising:
in the step of generating a tuning PSS gain value including determining an open loop frequency response of the grid-connected power generator system to determine a PSS gain margin and determining a tuning PSS gain as a function of the determined PSS gain margin, the determining of the open loop frequency response is as a function of generating compensating reactance ($X_{qcomp}$) and as a function of estimating washout time constant ($T_w$).

62. The method of claim 60, further comprising wherein the control module is configured for the determining of the open loop frequency response by applying white noise to an AVR summing point and wherein the control module is configured for generating the open loop frequency response using Fast Fourier Transform (FFT) as a function of the PSS output and the recorded applied pseudo white noise, the method further comprising:

applying pseudo white noise to an AVR summing point;

generating an open loop frequency response using Fast Fourier Transform (FFT) as a function of the PSS output and the applied pseudo white noise.

* * * * *